(12) United States Patent
Farrell et al.

(10) Patent No.: US 6,762,856 B2
(45) Date of Patent: Jul. 13, 2004

(54) METHOD FOR ACCELERATING PAPER TRAY PROGRAMMING

(75) Inventors: Michael E. Farrell, Ontario, NY (US); Frederick O. Kissinger, Penfield, NY (US)

(73) Assignee: Xerox Corporation, Stamford, CT (US)

(*) Notice: Subject to any disclaimer, the term of this patent is extended or adjusted under 35 U.S.C. 154(b) by 369 days.

(21) Appl. No.: 09/970,848

(22) Filed: Oct. 4, 2001

(65) Prior Publication Data

US 2003/0067618 A1 Apr. 10, 2003

(51) Int. Cl.[7] .............................................. G06K 15/00
(52) U.S. Cl. ..................... 358/1.8; 358/1.2; 358/1.9; 358/1.13
(58) Field of Search ........................ 358/1.9, 2.1, 1.8, 358/1.13, 1.17, 1.18, 1.2

(56) References Cited

U.S. PATENT DOCUMENTS

| | | | | |
|---|---|---|---|---|
| 5,229,814 | A | * 7/1993 | Hube | 355/203 |
| 5,402,222 | A | * 3/1995 | Haneda | 355/327 |
| 2001/0007619 | A1 | * 7/2001 | Kakutani | 400/582 |
| 2002/0051182 | A1 | * 5/2002 | Sommer | 358/1.15 |
| 2002/0131067 | A1 | * 9/2002 | Cox | 358/1.14 |

FOREIGN PATENT DOCUMENTS

JP 2001130104 * 5/2001 ............ B41J/29/38

OTHER PUBLICATIONS

Thomas A. Myers et al., "Resource Management For A Printing System Via Job Ticket," U.S. patent application Ser. No. 09/342,949, filed Jun. 29, 1999.

Jonathan A. Dorsey et al., "User Interface For Navigation And Control Of A Printing System," U.S. patent application Ser. No. 09/342,713, filed Jun. 29, 1999.

Thomas A. Myers, "Operator Notation Tool Tip,", U.S. patent application Ser. No, 09/342,373, filed Jun. 29, 1999.

* cited by examiner

Primary Examiner—Jerome Grant, II
(74) Attorney, Agent, or Firm—Lloyd F. Bean, II

(57) ABSTRACT

A printing system with one or more discrete print media trays, a marking engine and a controller in which prints are produced from a plurality of print jobs by using the controller to control delivery of print media sheets from the one or more discrete print media trays to the marking engine, each of the plurality of print jobs including a plurality of the predefined print media attributes; the one or more discrete print media trays respectively including the print media sheets having a plurality of print media attributes, a method for programming the one or more discrete print media trays, including selecting one print job of the a plurality of print jobs; correlating the plurality of the predefined printed attributes of the selected one of the plurality of print jobs to the plurality of print media attributes of the print media sheets stored in the at two discrete print media trays; and if the plurality of the predefined printed attributes do not correlate with the plurality of print media attributes of the print media stored one of the one or more discrete print media trays, assigning one or more of the plurality of the predefined printed attributes to one of the one or more discrete print media trays.

2 Claims, 23 Drawing Sheets

METHOD FOR ACCELERATING PAPER TRAY PROGRAMMING

BACKGROUND AND SUMMARY

Attention is directed to copending applications: U.S. patent application Ser. No. 09/342,949, entitled "RESOURCE MANAGEMENT FOR A PRINTING SYSTEM VIA JOB TICKET", filed on Jun. 29, 1999, by Thomas A. Myers et al., U.S. patent application Ser. No. 09/342,713 entitled "USER INTERFACE FOR NAVIGATION AND CONTROL OF A PRINTING SYSTEM", filed on Jun. 29, 1999, by Jonathan A. Dorsey et al. and U.S. patent application Ser. No. 09/342,373, entitled "OPERATOR NOTATION TOOL TIP", filed on Jun. 29, 1999, by Thomas A. Myers. The disclosures of these applications are hereby incorporated by reference in their entirety.

This invention relates generally to a system for managing the delivery of print media to a marking engine in a printing system and, more particularly to a method for accelerating paper tray programming.

Electronic printers and printing systems provide the operator or user with as many job programming options and selections as reasonably possible. One very significant programming option is choice of stock, i.e. the print media on which the prints are made. One desirable stock type is ordered stock such as precut tabs, a series of different color sheets, etc. However, when using ordered stock, care must be taken to assure that the correct image is printed on the correct stock throughout the print process. For example, when using precut tabs, one must be sure that the image being printed matches up with the correct tab and that this remains so during the entire printing process. Otherwise, should there be for some reason a mismatch during the printing process, not only will the affected image end up printed on the wrong tab, but the entire sequence of images printed thereafter will be disrupted with the remaining images on the wrong tabs.

The Xerox DT135 and other printers are capable of job streaming which employs an attribute based paper tray selection model. In this model, print jobs are programmed to use paper stocks described by their attributes; the contents of the paper trays are described using these same attributes. The printer then automatically selects the paper trays by comparing stock descriptions. This indirect paper tray selection model is required to allow jobs to be programmed well in advance of printing and to support jobs that contain more stocks than available pick points.

In response to customer requests, production and office printers are offering increasing numbers of stock pick points (a.k.a. paper trays, paper feeders, or special material handlers). The 6180 printer has 5 pick points; The 4×35 printers have up to 6 pick points. Printers capable of having up to 10 pick points; the number and complexity of the stock attributes supported by these printers are also increasing in order to provide sophisticated printer functionality, e.g. automated recovery and image shift for collated precut tab stock. Examples of stock attributes are: Size, with type in fields for custom sizes; Color, with type in fields for custom colors; Type, with type in fields for collated stock modulus value; Basis Weight; Drilled or not; Stock name (LCDS context) or stock identifier (Constellation context); Basis, e.g. offset, bond, cover (Unique to Constellation).

In Xerox production printers (e.g. DT65, DT135, DT6180) the accuracy of the paper stock description is important because: Pick points are selected automatically by evaluating paper stock attributes. Stock equivalence for purposes of automatic tray switching is determined by comparing paper stock attributes.

A problem with the current approaches of explicit tray programming is it takes too long and is error prone. It's lengthy because of the number of attributes that need to be set and the fact that some attributes require keyboard entry. Customers have complained about the time and effort required to perform paper tray programming.

A method is needed to accelerate the process of describing the contents of a paper tray and to reduce the possibility of erroneous data entry.

An object of the present invention is to provide an alternative method of paper tray programming in production printers. In this method, paper tray programming is accomplished by providing a user mechanism for copying the group of paper stock attributes that constitute a paper stock description as a single entity. Also described is the use of this mechanism to copy groups of paper stock attributes from job processing instructions or other paper trays. Advantageous features of the present invention include: Programming a paper tray by copying the collection of attributes that constitute the paper stock description as a single entity; Using paper stock description in the job processing instructions as the source for paper tray programming; and Using paper stock description of one tray as the source for paper tray description of other trays.

There is provided a printing system with one or more discrete print media trays, a marking engine and a controller in which prints are produced from a plurality of print jobs by using the controller to control delivery of print media sheets from the one or more discrete print media trays to the marking engine, each of said plurality of print jobs including a plurality of said predefined print media attributes; the one or more discrete print media trays respectively including the print media sheets having a plurality of print media attributes, a method for programming the one or more discrete print media trays, comprising: selecting one of said a plurality of print jobs; correlating said plurality of said predefined print attributes of the selected one of said plurality of print jobs to said plurality of print media attributes of the print media sheets stored in said one or more discrete print media trays; and if said plurality of said predefined print attributes do not correlate with said plurality of print media attributes of the print media stored one of said one or more discrete print media trays, assigning one or more of said plurality of said predefined printed attributes to one of said one or more discrete print media trays.

There is provided a graphical user interface for associating a tray with stock from one or more media sources displayed on a display screen including a depiction of a printing system shown on the display screen including at least one tray icon; a depiction of a pathway access window including one or more media sources; a depiction of stock icons on the display screen associated with one or more media sources.

There is also provided a printing system for printing image data received from a computer network, scanner or other image data generating device on a support material, comprising: a supply unit having a plurality of feeders, wherein each feeder has at least one tray for storing support material; a controller including: a system controller processing the received image data; and a user interface comprising: a depiction of a printing system shown on the display screen including at least one tray icon.

A depiction of a pathway access window including one or more media sources; a depiction of stock icons on the display screen associated with one or more media sources; an operator notation tool tip identifying stocks in the one or more media sources when one of the one or more media sources are highlighted; a print engine including: a charging unit charging a surface of a photoconductive belt; at least one exposure unit exposing a photoconductive belt to create an electrostatic latent image based on the received image data at the direction of the system controller; at least one developer unit having charged toner particles, which are attracted to the electrostatic latent image; a transfer unit receiving support material and transferring the toner from the photoreceptor belt to the support material; a fuser assembly receiving the support material from the transfer unit and permanently affixing the toner to the sheet of support material; and a cleaning unit cleaning the photoreceptor belt; and a finishing unit, coupled to the print engine, the finishing unit comprising at least one of a stacker, binder, stapler and inserter.

DETAILED DESCRIPTION OF THE PRESENT INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined in the appended claims.

Figure 1:
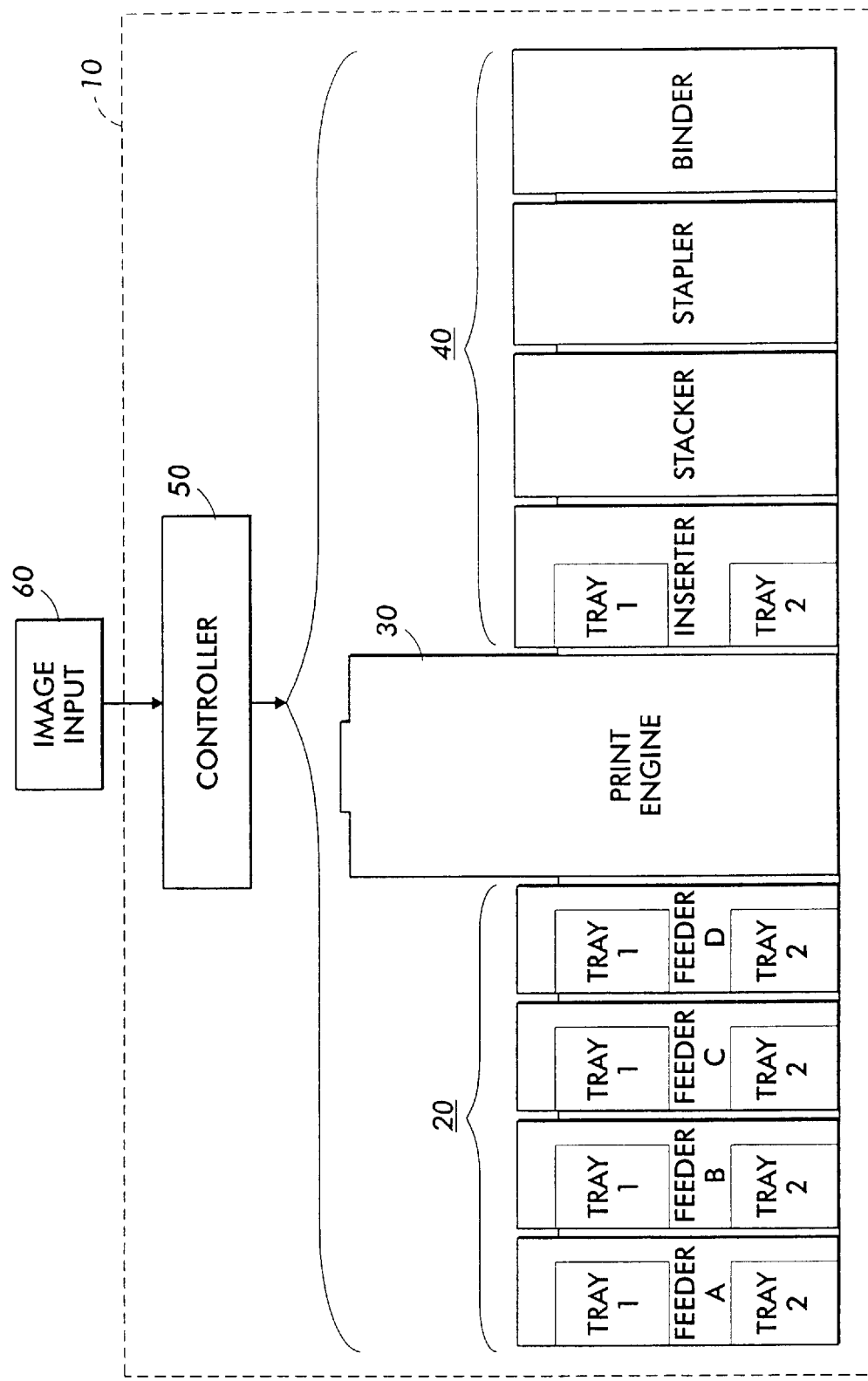
FIG. 1 shows a digital printing system into which the preferred embodiments may be incorporated.

FIG. 1 shows a digital printing system 10 of the type suitable for use with the preferred embodiment for processing print jobs. As shown, the digital printing system includes document feeders 20, a print engine 30, and finishers 40 and controller 50. The digital printing system 10 is coupled to an image input section 60.

Figure 2:
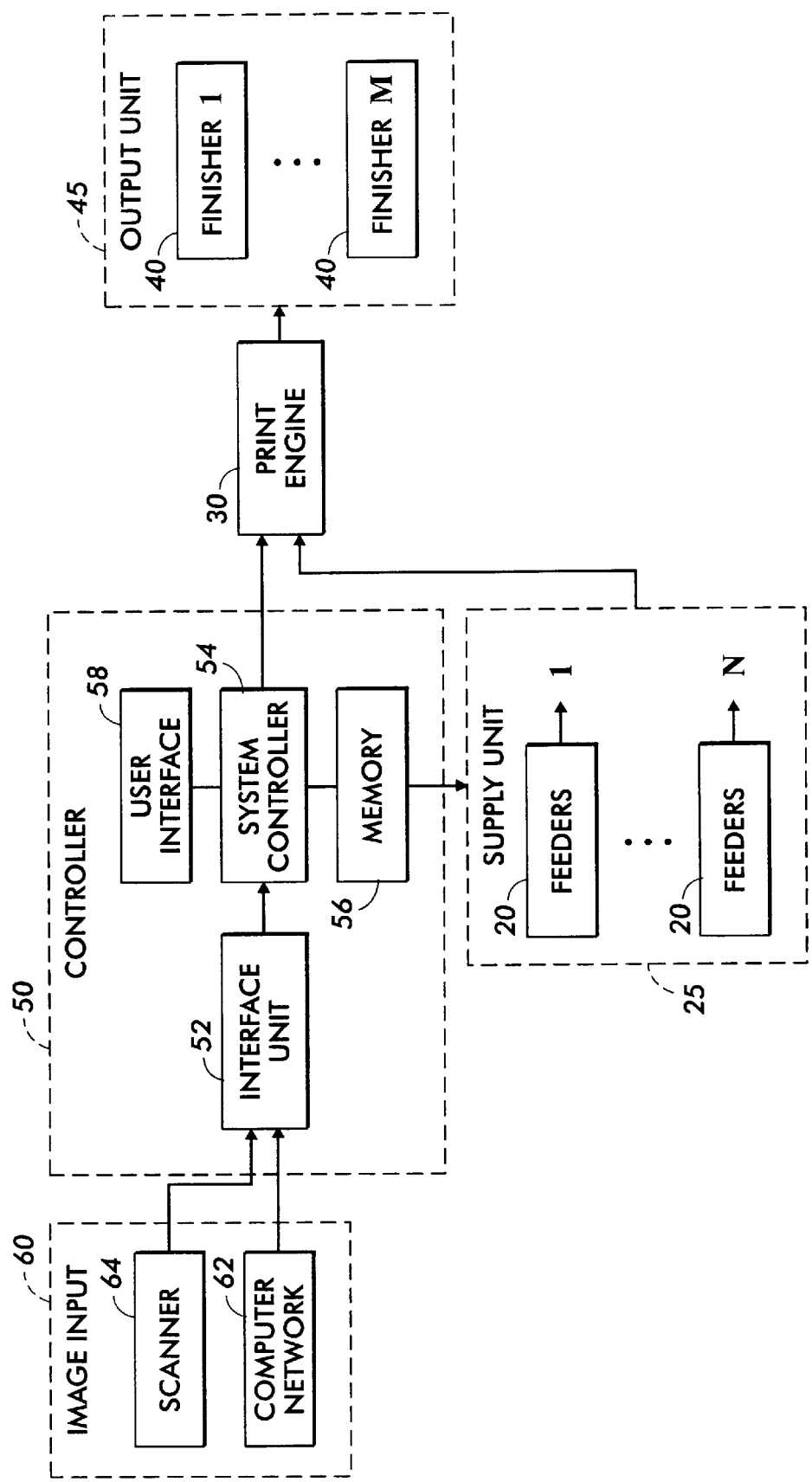
FIG. 2 is a general block diagram of the printing system shown in FIG. 1.

As shown in FIG. 2, the image input section 60 transmits signals to the controller 50. In the example shown, image input section 60 has both remote and onsite image inputs, enabling the digital printing system 10 to provide network, scan and print services. In this example, the remote image input is a computer network 62, and the onsite image input is a scanner 64. However, the digital printing system 10 can be coupled to multiple networks or scanning units, remotely or onsite. Other systems can be envisioned such as stand alone digital printing system with on-site image input, controller and printer. While a specific digital printing system is shown and described, the present invention may be used with other types of printing systems such as analog printing systems.

The digital printing system 10 can receive image data, which can include pixels, in the form of digital image signals for processing from the computer network 62 by way of a suitable communication channel, such as a telephone line, computer cable, ISDN line, etc. Typically, computer networks 62 include clients who generate jobs, wherein each job includes the image data in the form of a plurality of electronic pages and a set of processing instructions. In turn, each job is converted into a representation written in a page description language (PDL) such as PostScript® containing the image data. Where the PDL of the incoming image data is different from the PDL used by the digital printing system, a suitable conversion unit converts the incoming PDL to the PDL used by the digital printing system. The suitable conversion unit may be located in an interface unit 52 in the controller 50. Other remote sources of image data such as a floppy disk, hard disk, storage medium, scanner, etc. may be envisioned.

For on-site image input, an operator may use the scanner 64 to scan documents, which provides digital image data including pixels to the interface unit 52. Whether digital image data is received from scanner 64 or computer network 62, the interface unit 52 processes the digital image data in the form required to carry out each programmed job. The interface unit 52 is preferably part of the digital printing system 10. However, the computer network 62 or the scanner 64 may share the function of converting the digital image data into a form, which can be unutilized by the digital printing system 10.

As indicated previously, the digital printing system 10 includes one or more (1 to N) feeders 20, a print engine 30, one or more (1 to M) finishers 40 and a controller 50. Each feeder 20 preferably includes one or more trays, which forward different types of support material to the print engine 30. All of the feeders 20 in the digital printing system 10 are collectively referred to as a supply unit 25. All of the finishers 40 are collectively referred to as an output unit 45. The output unit 45 may comprise several types of finishers 40 such as inserters, stackers, staplers, binders, etc., which take the completed pages from the print engine 30 and use them to provide a finished product.

Figure 3:
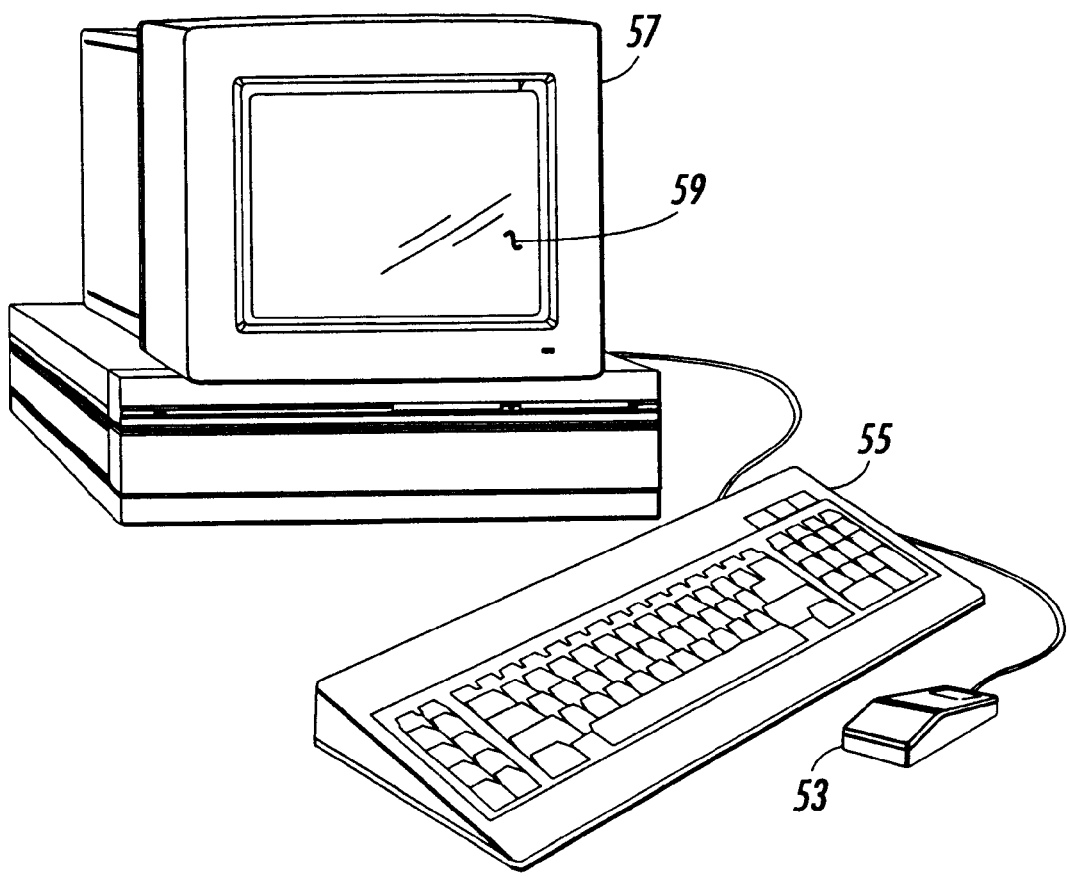
FIG. 3 is a general diagram of a few of the components of the user interface shown in FIG. 2.

The controller 50 controls and monitors the entire digital printing system 10 and interfaces with both on-site and remote input units in the image input section 60. The controller 50 includes the interface unit 52, a system control unit 54, a memory 56 and a user interface 58. The system control unit 54 receives print engine information from sensors throughout the digital printing system 10. The user interface 58 includes an area holding a graphic representation or picture of the feeders 20, print engine 30 and finishers 40 of the digital printing system 10. The user interface 58 permits an operator to monitor the document feeders 20, print engine 30 and finishers 40 by navigating through a series of menus by highlighting, clicking, double-clicking, etc. on a section or otherwise opening a section of the graphical representation of the user interface 58 to reach controls or information related to that component of the digital printing system 10. Therefore, a user (also called an operator) can associate tasks done on the user interface 58 with their physical location on the digital printing system 10 and thereby enable faster and more intuitive navigation. The user interface 58 preferably includes at least a mouse 53, a keyboard 55 and a display unit 57 as shown in FIG. 3. The display unit 57 has a display screen 59.

Figure 4:
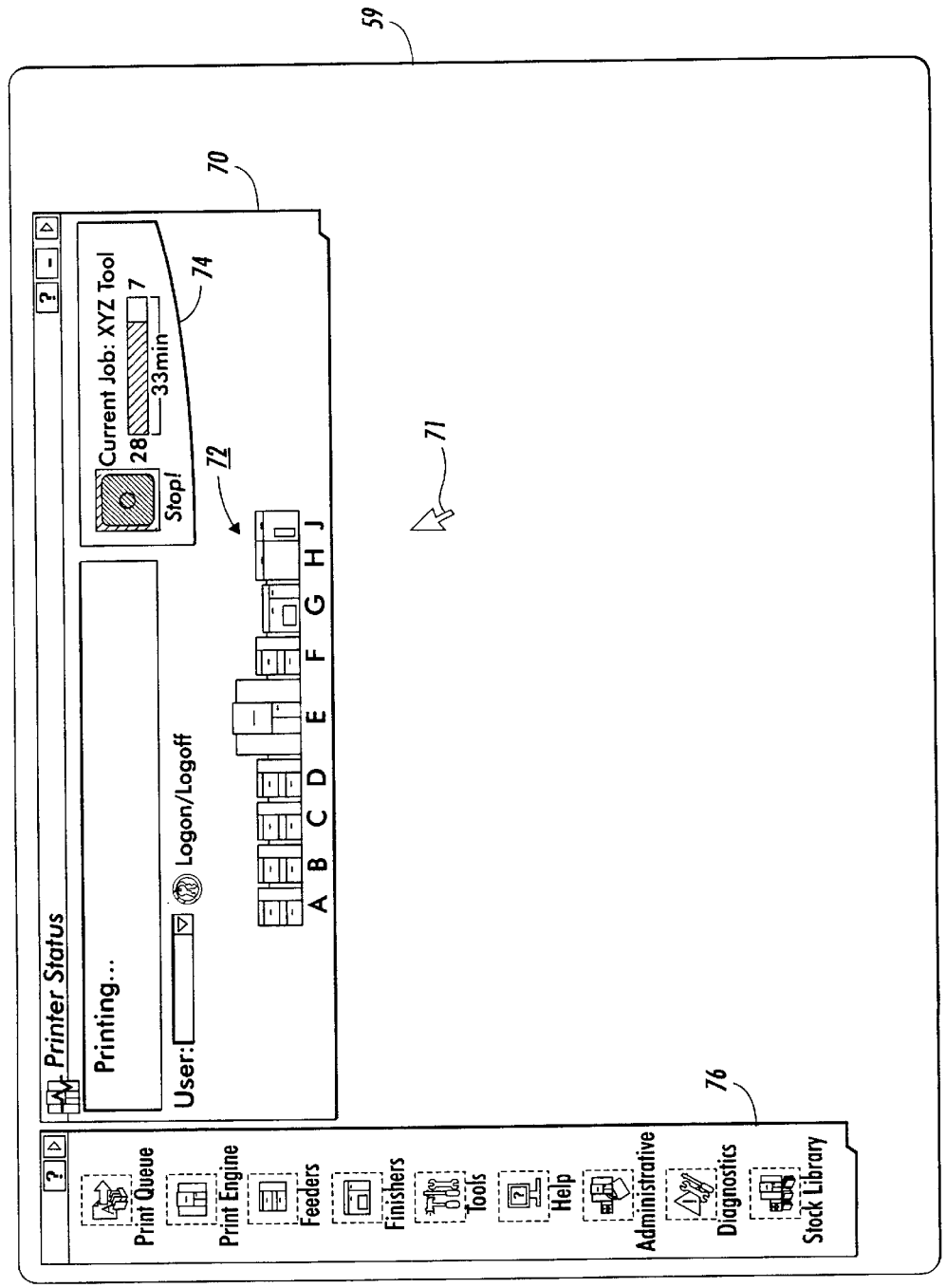
FIG. 4 is a view depicting an exemplary graphical representation of printer status window and pathway access window displayed on a user interface screen of the printing system shown in FIGS. 1 and 2.

FIGS. 4–17 show a series of menus and graphical representations displayed on a display screen 59, which are used to reach controls or information related to components or supplies in the digital printing system 10. FIG. 4 shows a printer status window 70 having a printer icon 72 including feeder icons A–D, print engine icon E, and finisher icons F–J. However, as indicated above, feeder icons and finisher icons can be added or removed so that the printer icon 72 is an accurate depiction of the printing system actually being used by the operator. The printer status window 70 also includes a job progress meter 74, which continuously informs the operator of the total time required to complete a print job (e.g. 33 minutes), the time that has elapsed since the print job began (e.g. 28 minutes) and the time remaining (7 minutes). This enables the operator to make choices as to whether to stop or suspend the current job in order to process a higher priority job. FIG. 4 also shows a pathway access window 76, which also provides access to information and control of the digital printing system 10.

Figure 5:
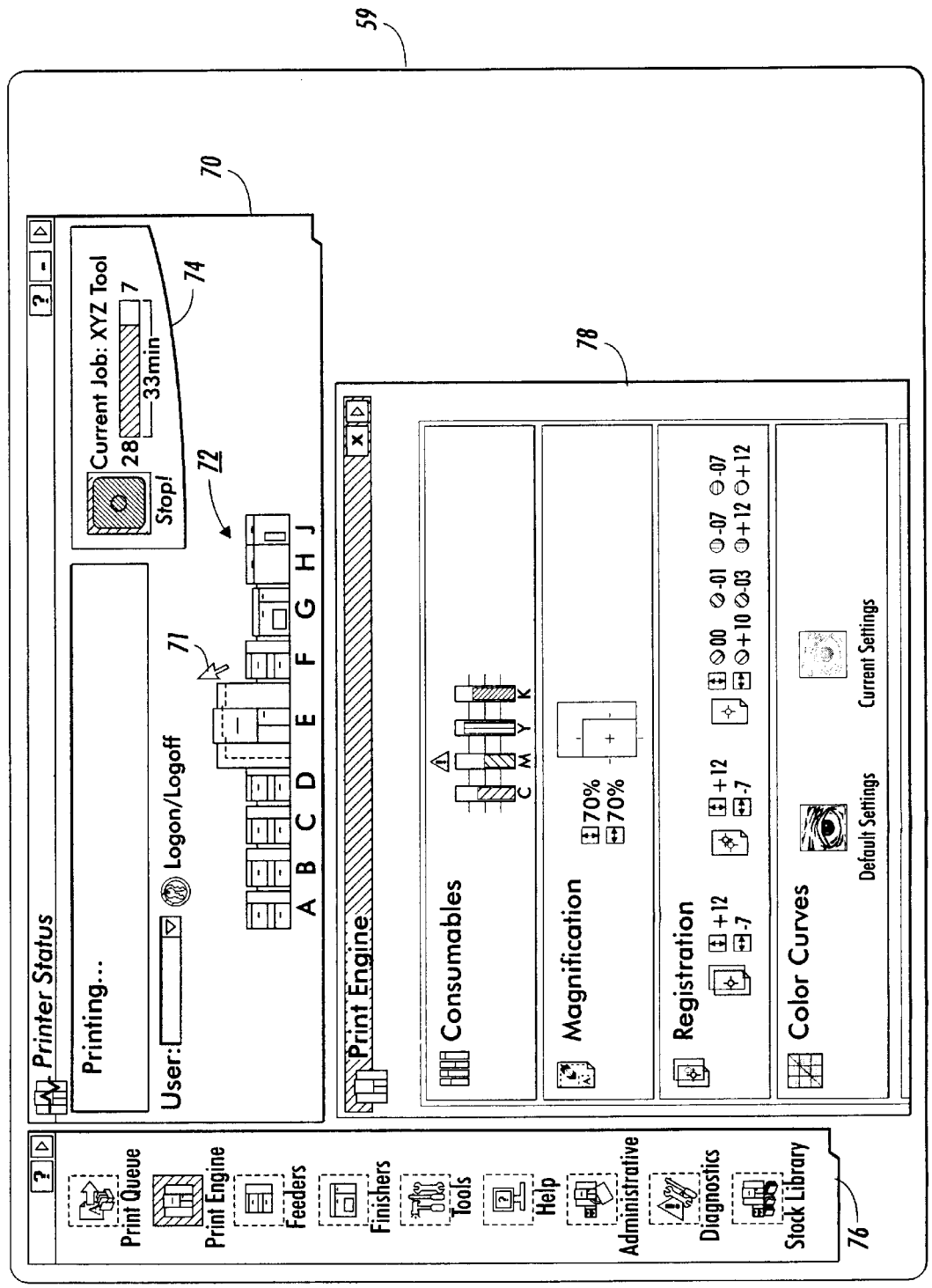
FIG. 5 is a view depicting an exemplary graphical representation of print engine settings and supplies displayed on a user interface screen of the printing system shown in FIGS. 1 and 2.
Figure 6:
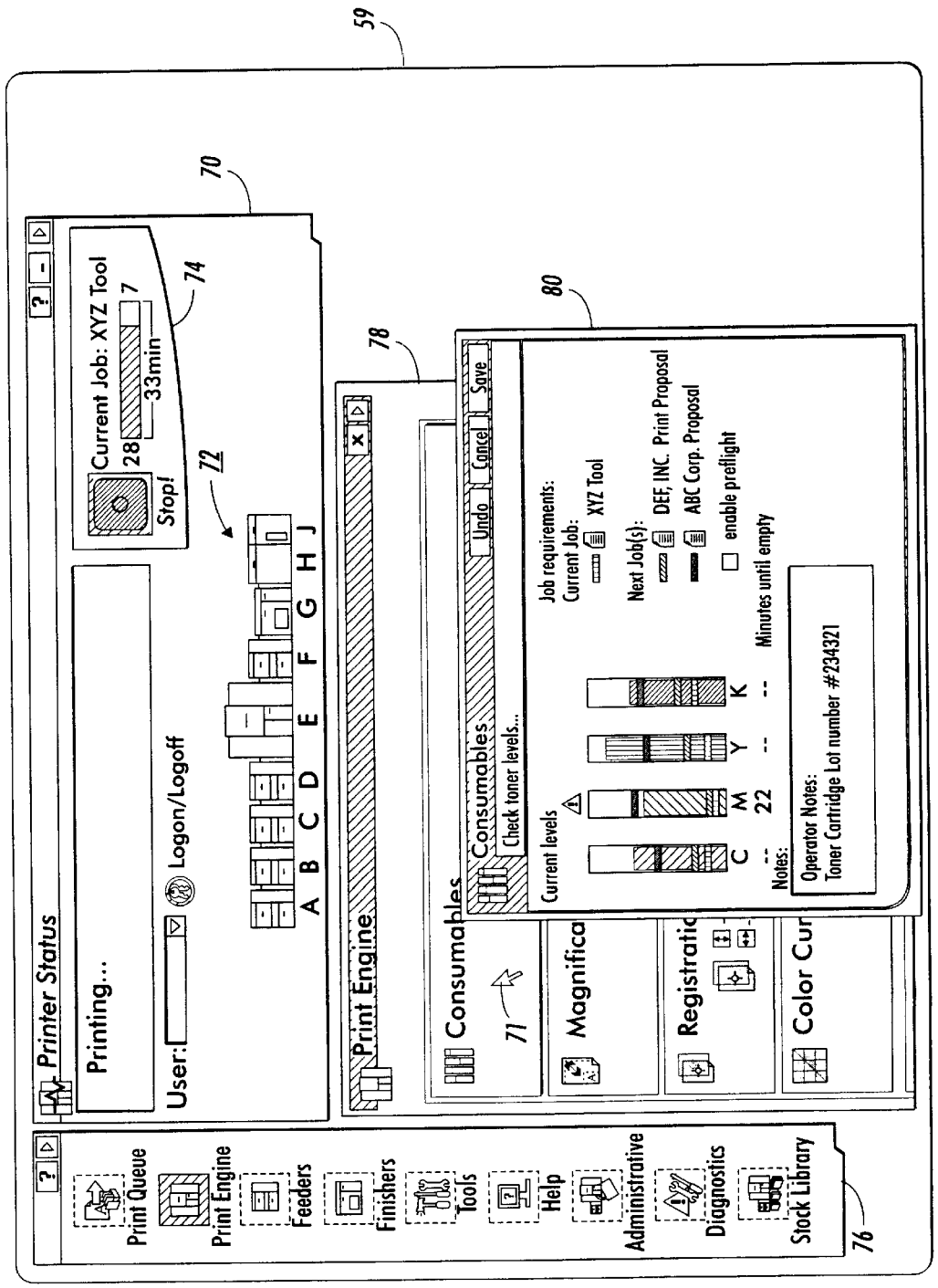
FIG. 6 is a view depicting an exemplary graphical representation of print engine consumables displayed on a user interface screen of the printing system shown in FIGS. 1 and 2.

By highlighting and then clicking on the print engine icon E of the printer status window 70 or by clicking on the print engine icon/button of the pathway access window 76, print engine information 78 is displayed as shown in FIG. 5. The print engine information is a summary of the current amount of consumables such as toner as well as the current magnification, registration and color curve settings. By clicking on consumables, more detailed consumable information 80 regarding the current toner levels in the print engine 30 are displayed as shown in FIG. 6. This window shows the user the current toner levels and the amount needed by each job in the print ready queue. The system alerts the user that it will run out of toner if all the jobs currently in the print ready queue combined require more toner than is currently available. Magenta is an example of this situation. All the jobs in the queue combined require more magenta toner than is available, so in 22 minutes, the system will halt.

Figure 7:
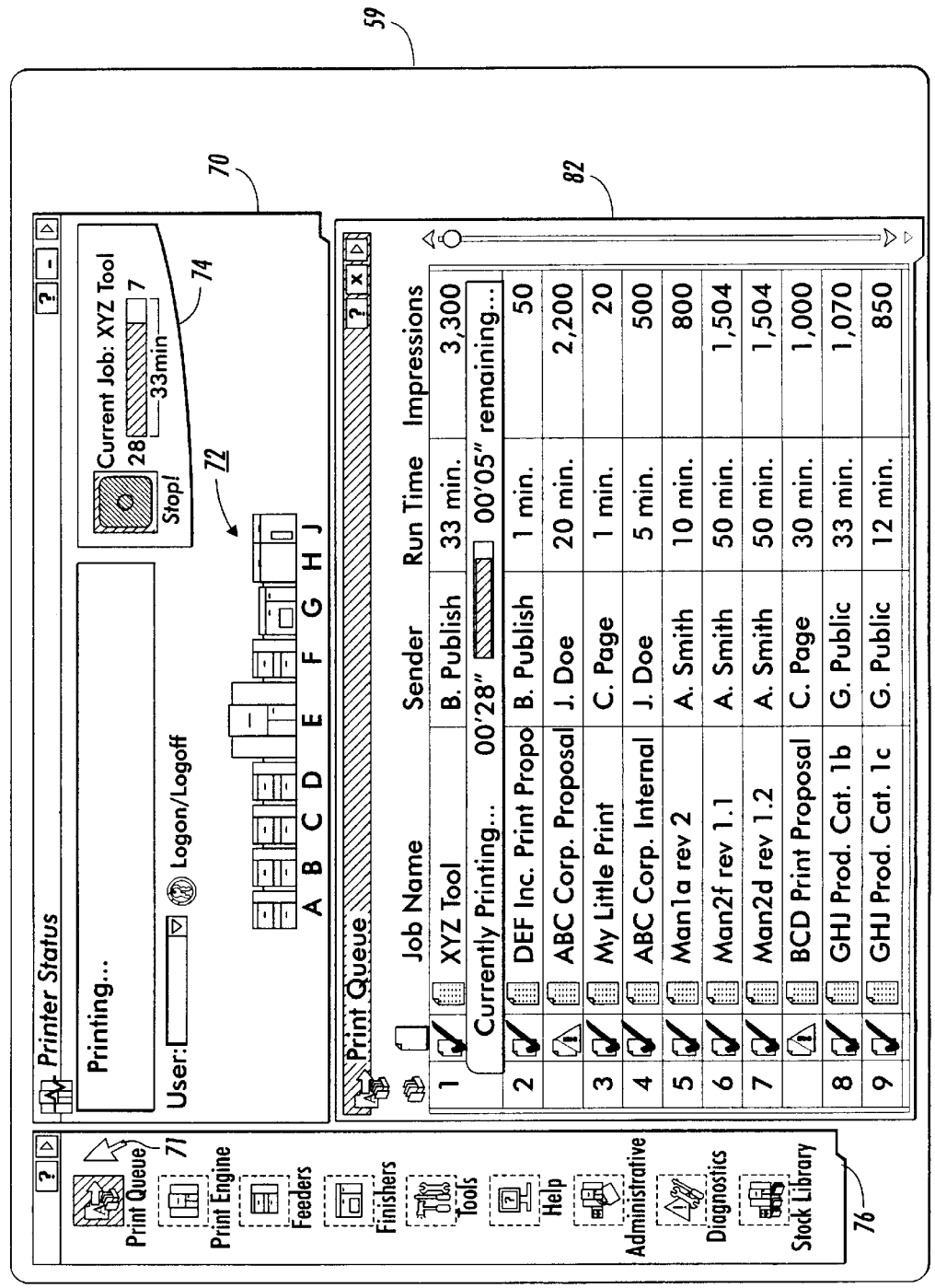
FIG. 7 is a view depicting an exemplary graphical representation of print queue displayed on a user interface screen of the printing system shown in FIGS. 1 and 2.

Referring to FIG. 7, by highlighting and clicking on the print queue icon, a depiction of the print queue 82, showing a list of active print jobs is displayed on display screen 59. A check mark icon displayed next to an active print job indicates that there are enough resources within the system to complete the print job. However, if an icon such as the exclamation point inside a triangle is displayed next to an active print job, then this notifies the operator that there are insufficient resources to complete the print job. By clicking on an active print job in the print queue list 59, a window, showing print job information from which required stock information 84, required finishing information 86 and required resources information 88 can be accessed, is displayed on display screen 59 (FIGS. 8 through 11).

Figure 8:
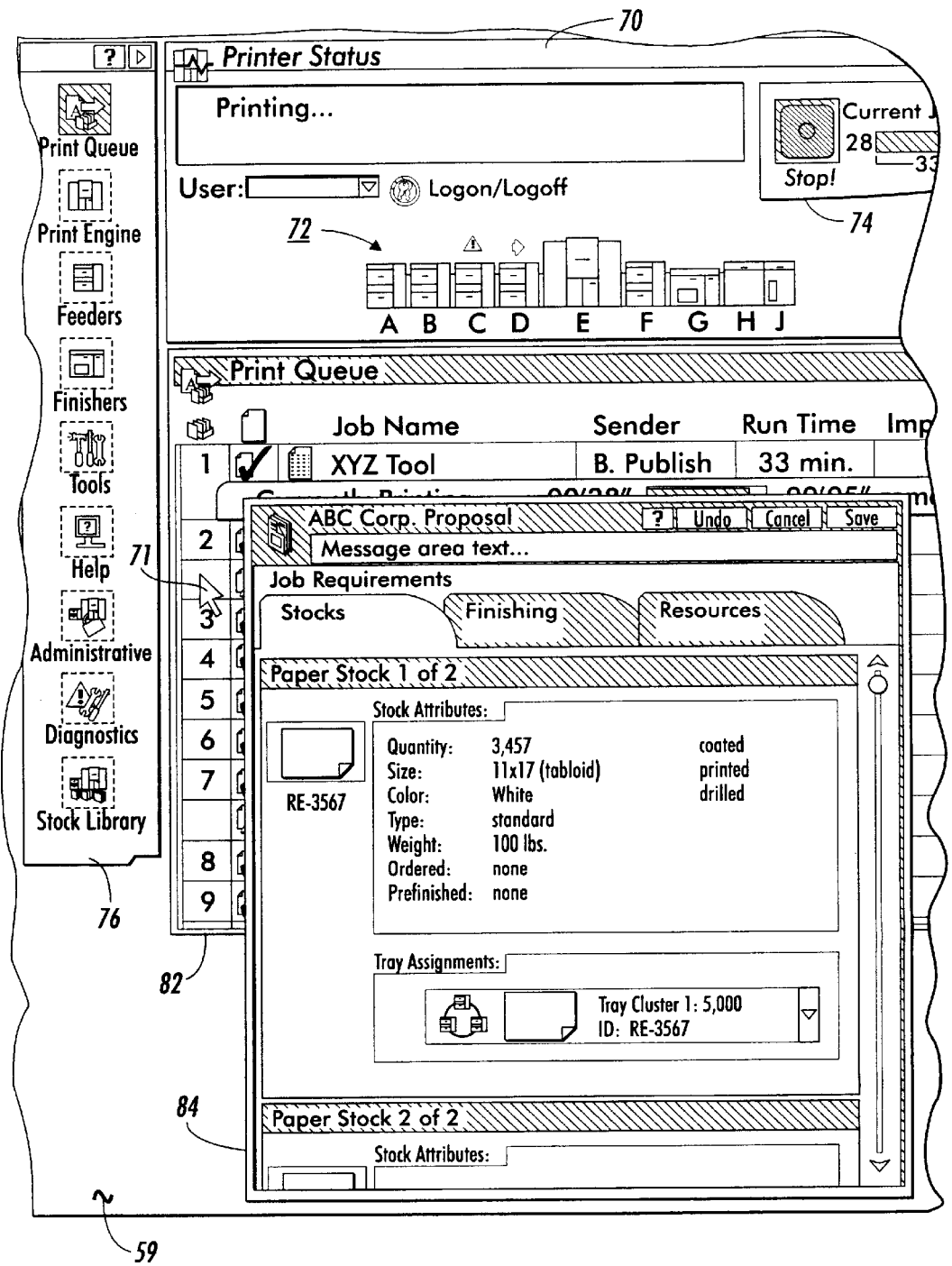
FIG. 8 is a view depicting an exemplary graphical representation of required stock information displayed on a user interface screen of the printing system shown in FIGS. 1 and 2.

FIG. 8 shows a list of stocks, and their associated attributes required for the job. Attributes can include: quantity, size, color, type, weight, ordered, and prefinished. Additionally, if a tray within the machine currently contains a required stock, it is also displayed below the stock. An operator can scroll through this list to see which of the required stocks is not programmed in the machine or requires replenishment. Both the available stock (current amount of stock in trays) and the required amount of stock are displayed.

Figure 9:
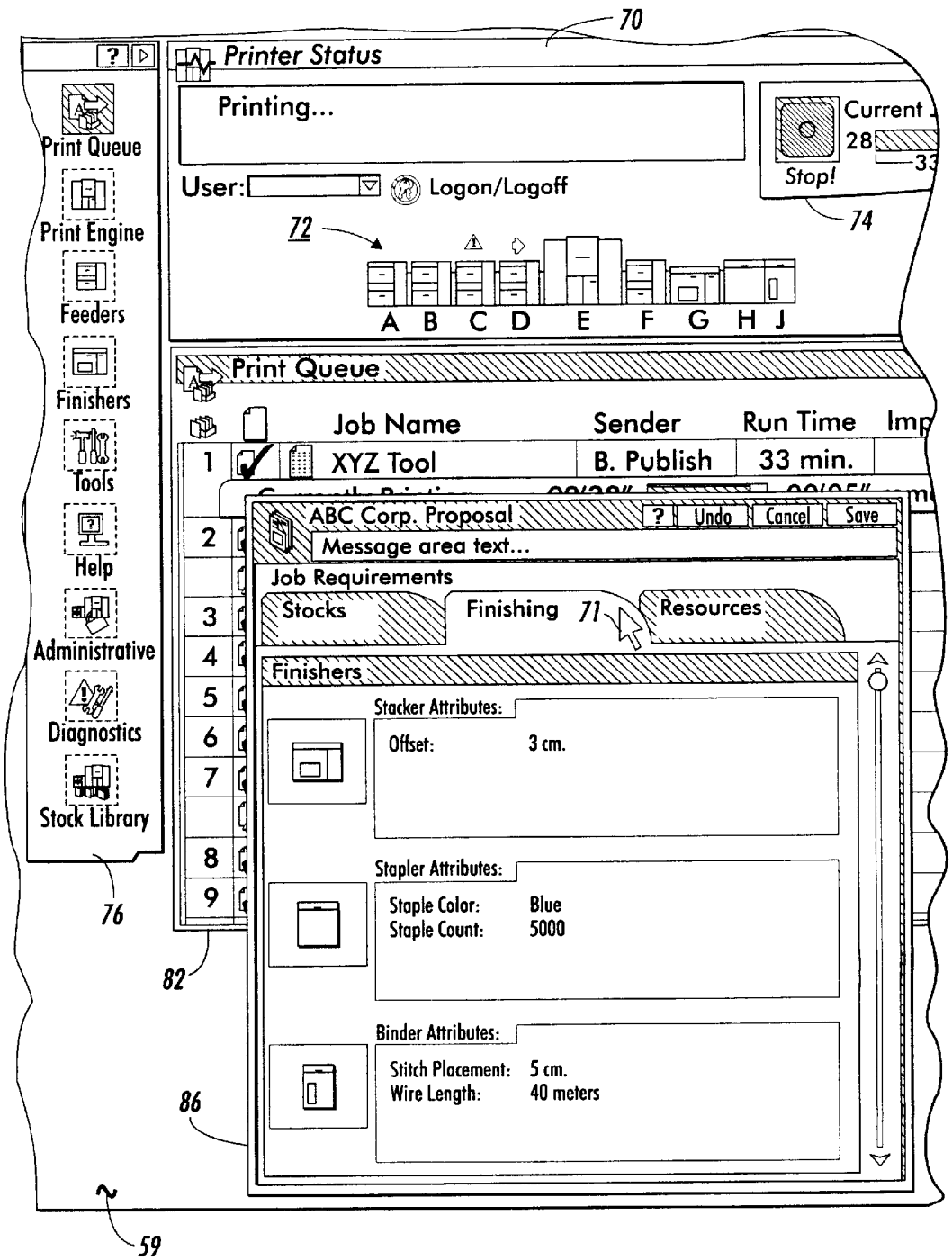
FIGS. 9–10 are views depicting an exemplary graphical representation of required finishing information displayed on a user interface screen of the printing system shown in FIGS. 1 and 2.
Figure 10:
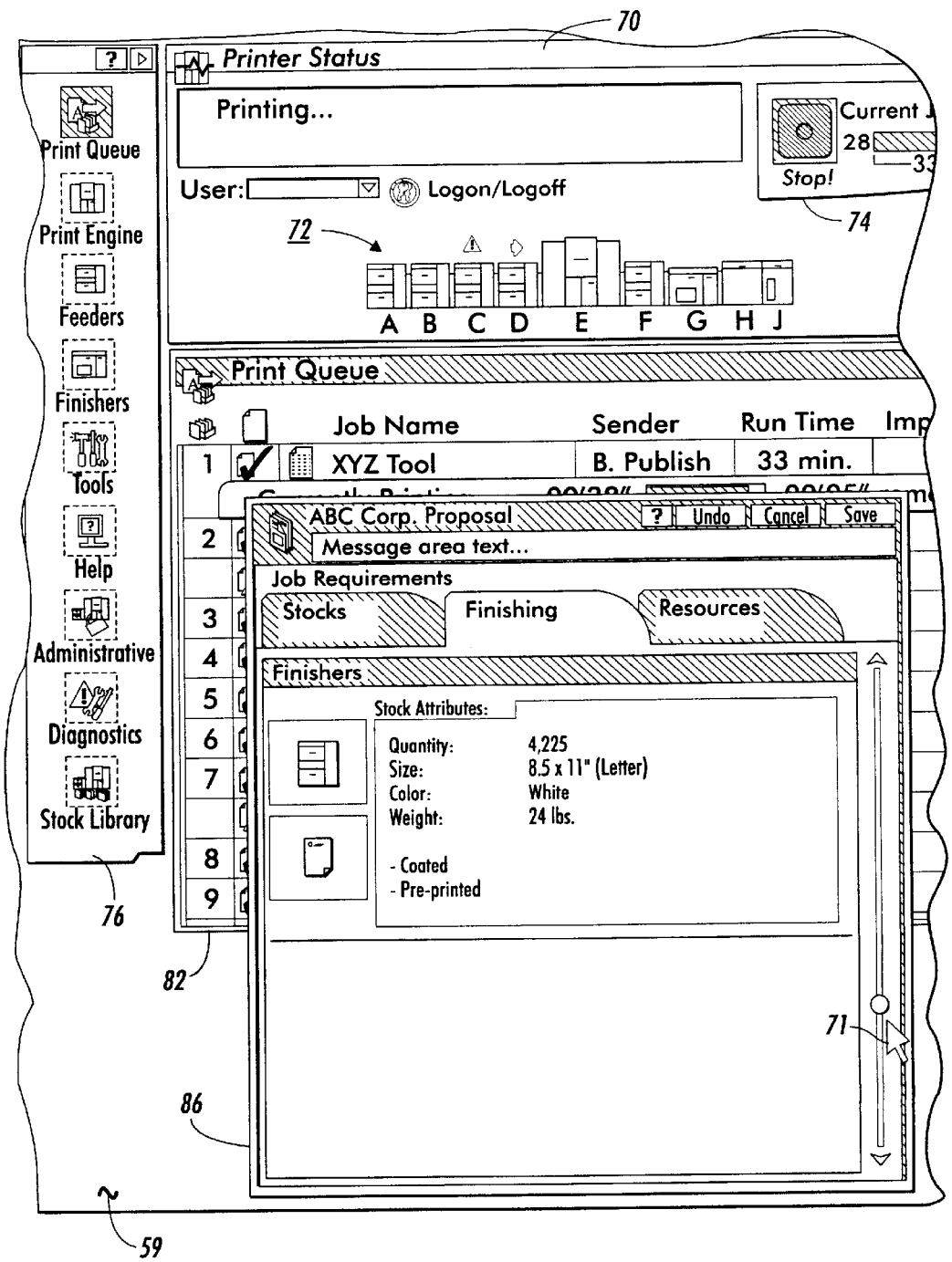

FIGS. 9–10 show the available (current) and required finishing materials for finishing units 20. This finishing information 86 depends upon the types of finishing units 20 in the digital printing system 10. For example, if an inserter is required for the print job, then the number of required sheets and other pertinent information would be shown. If a stapler was needed to complete the print job, the number of staples would be part of the information displayed. If a binder was needed to complete the print job, the type and required amount of binder wire would be part of the information displayed. If a stacker is required to complete the print job, the required stack offset settings would be displayed.

Figure 11:
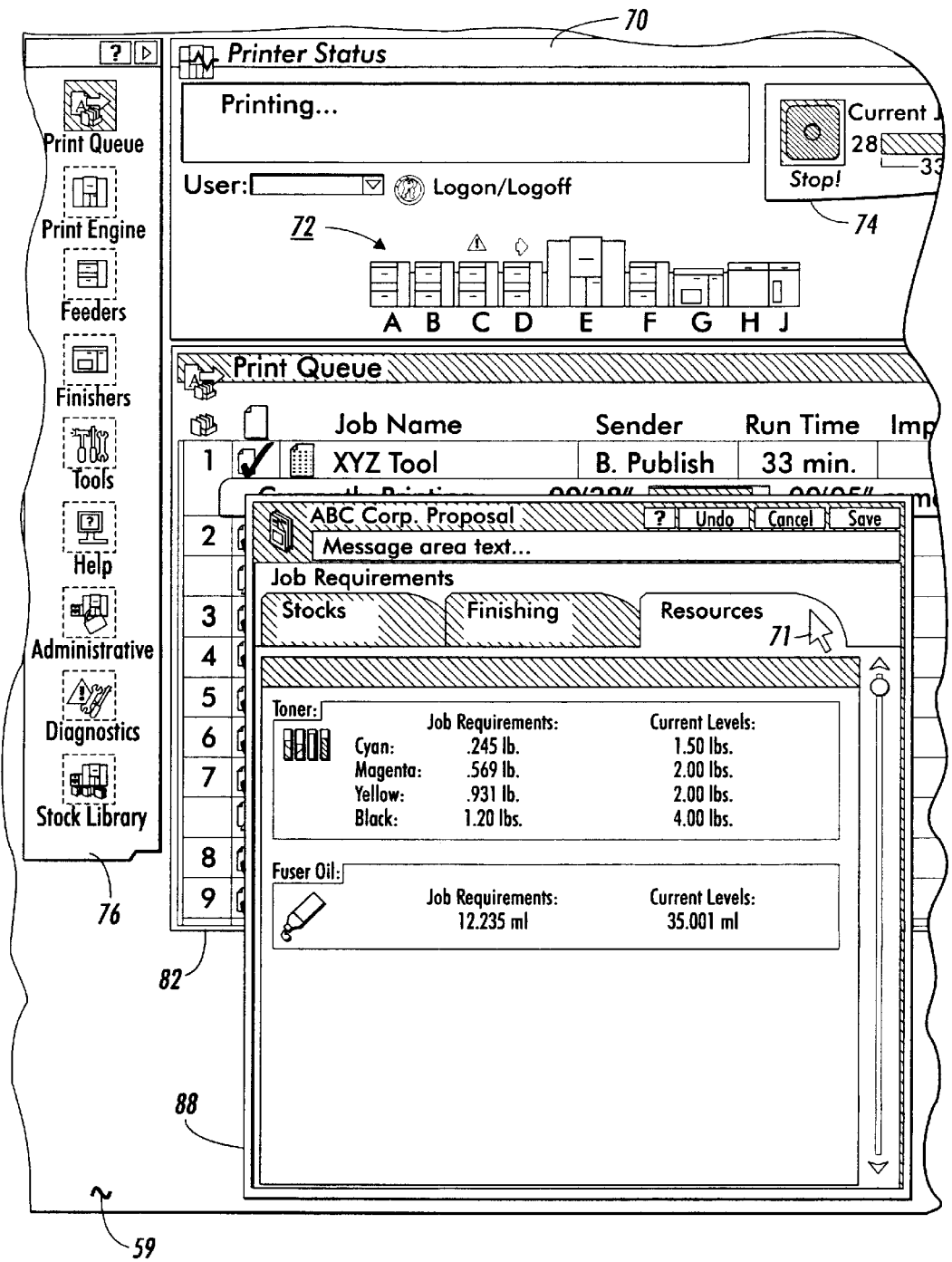
FIG. 11 is a view depicting exemplary graphical representation of required resources information displayed on a user interface screen of the printing system shown in FIGS. 1 and 2.

FIG. 11 shows the available (current) and required resources for the print engine 30 such as toner or fuser oil. The operator recognizes how much additional toner or fuser oil may be required by comparing the present levels within the system with the requirements of that particular job.

Figure 12:
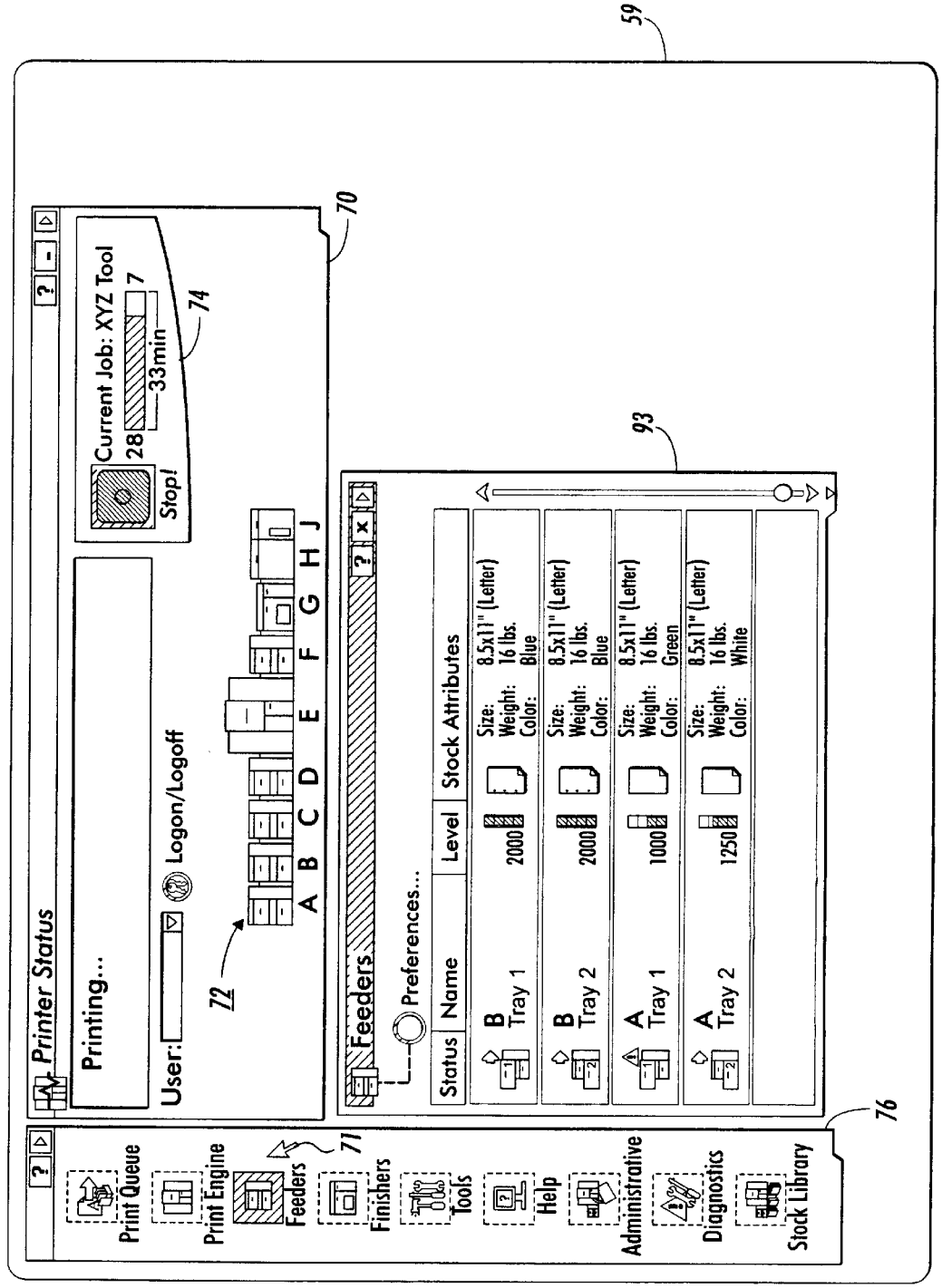
FIG. 12 is a view depicting an exemplary graphical representation of feeders displayed on a user interface screen of the printing system shown in FIGS. 1 and 2.
Figure 13:
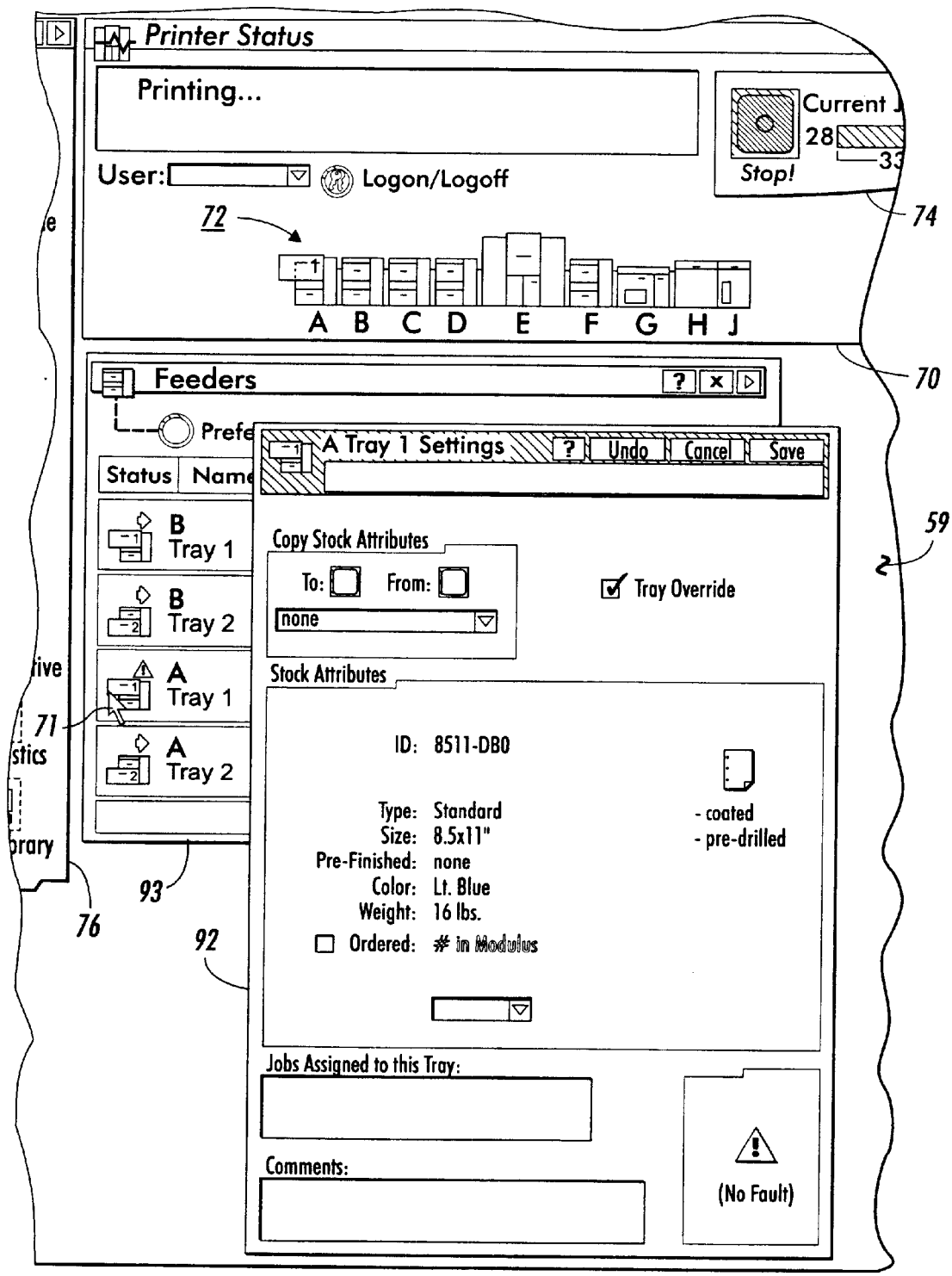
FIG. 13 is a view depicting an exemplary graphical representation of tray information of a feeder displayed on a user interface screen of the printing system shown in FIGS. 1 and 2.

As indicated above, an operator can monitor the feeders 20 by highlighting and then clicking on a tray of a feeder as shown in FIG. 13. FIG. 13 shows a display of feeder A tray 1 information 92, which provides the attributes of the support material or stock currently in tray 1 of feeder A. The operator can change the type of stock contained in the tray from here and also turn the tray override setting on or off. A brief summary of the stock attributes in each tray of each feeder is displayed by clicking on feeders in the pathway access window 76 as shown in FIG. 12.

Figure 14:
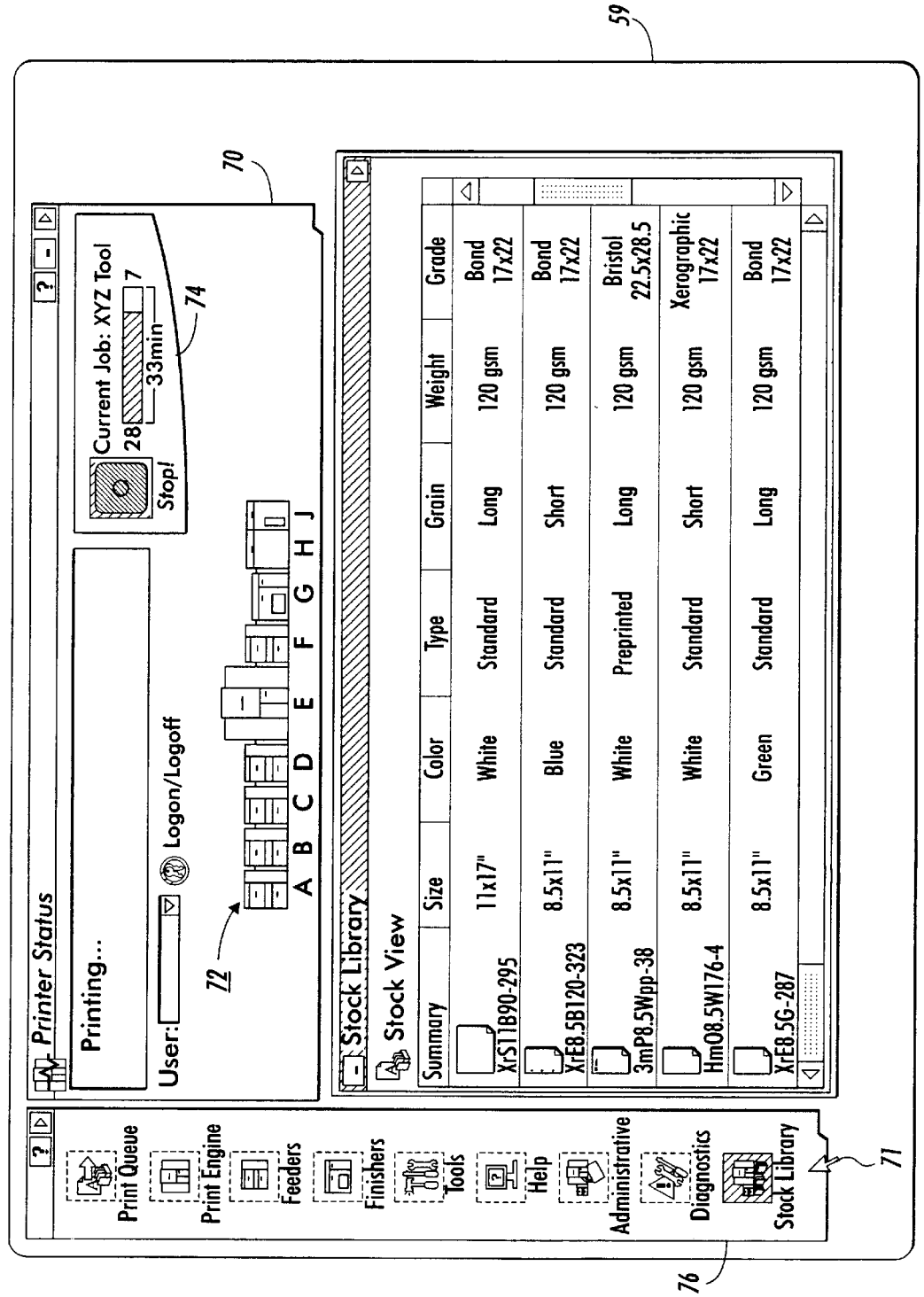
FIG. 14 is a view depicting an exemplary graphical representation of display of stock library information displayed on a user interface screen of the printing system shown in FIGS. 1 and 2.
Figure 15:
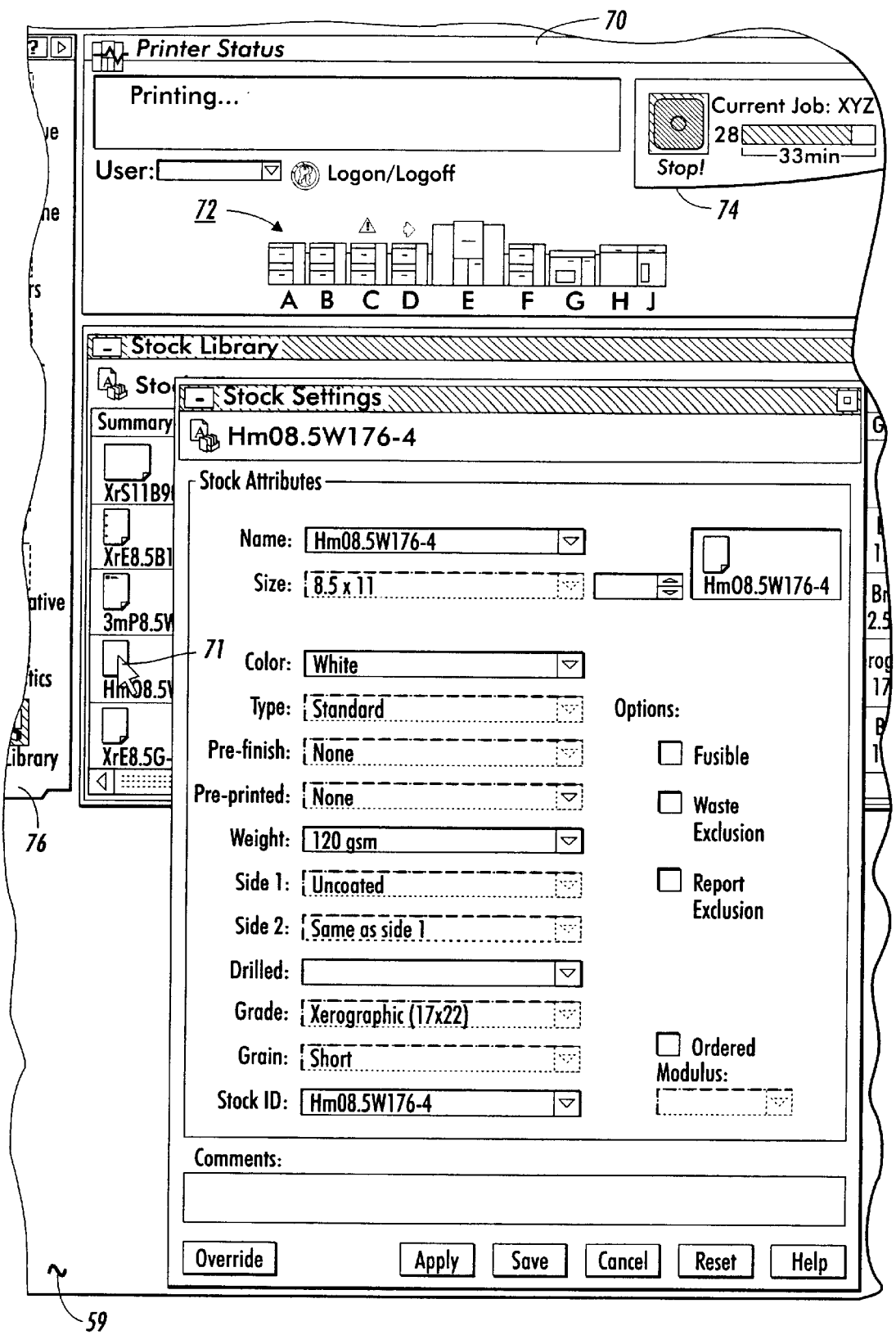
FIG. 15 is a view depicting an exemplary graphical representation of specific stock attributes of (HM08.5W176-4) information displayed on a user interface screen of the printing system shown in FIGS. 1 and 2.

FIG. 14 shows a display of stock library having information, which provides a brief summary of the stock attributes of stock loaded in stock library. FIG. 15 shows specific stock attributes of (HM08.5W176-4) where the setting can be edited by the operator and saved. A new stock name can be selected which will be added to stock library.

Figure 16:
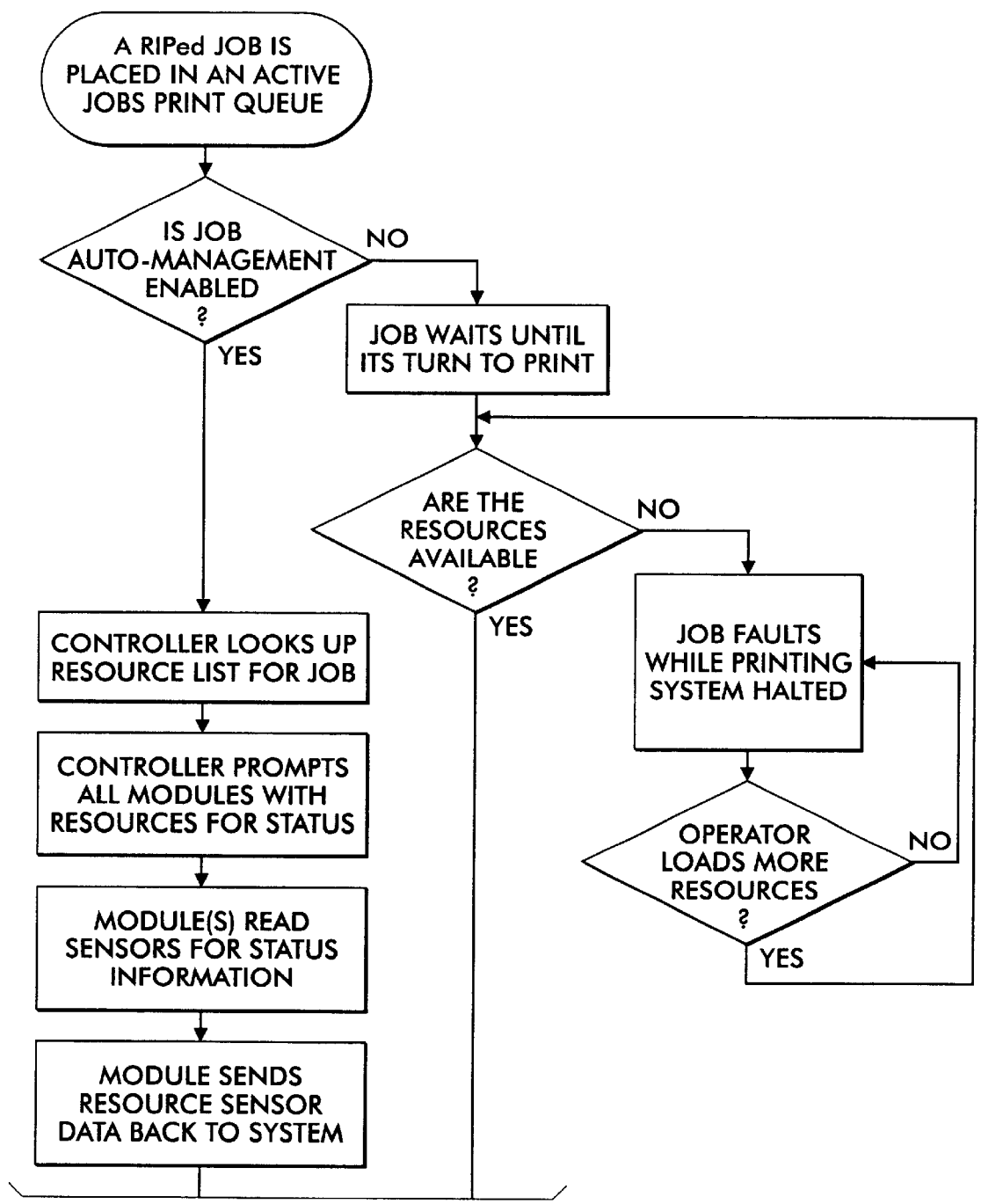
FIGS. 16–17 are flow charts showing the management resource process.
Figure 17:
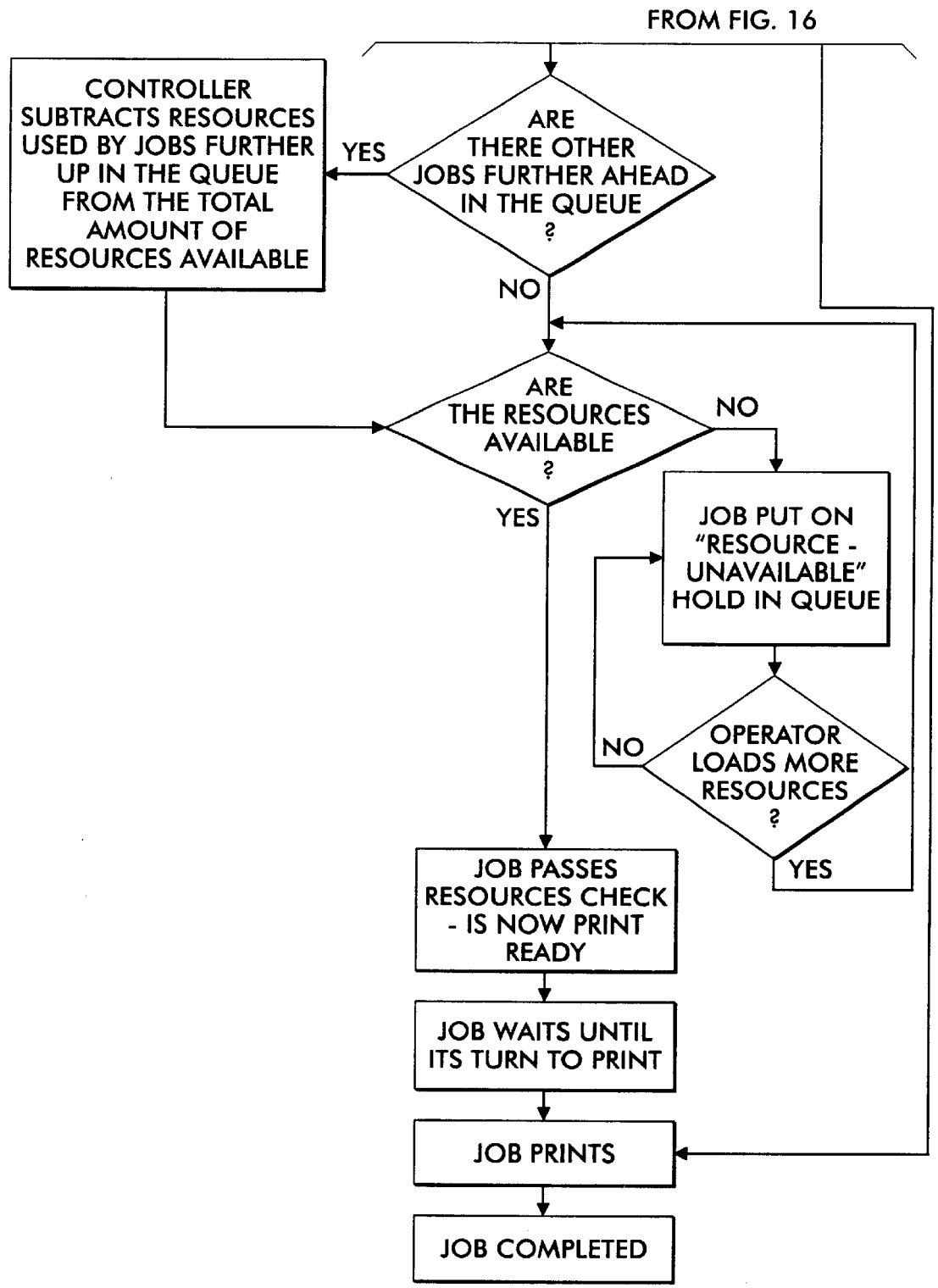

FIGS. 16 and 17 are flow charts showing the resource management process, which notifies the operator that there is insufficient information to complete a particular print job. Each RIPed job is placed in a print queue. A RIPed job is a job that has been Raster Image Processed into a print ready format. However, any method of placing image data in a print ready format is acceptable. In small printing systems, where there may only be one feeder 20 having one or two trays, there may not be enough space to store different types of support material to complete many large jobs requested by clients. Therefore, the operator must supply additional support material or different support material several times to complete just one print job. In these cases, the job auto-management is disabled because continuous operation of the printer to complete a job is not possible. Instead, the controller 50 will check whether the resources are available to continue the print job. If the resources are available, the digital printing system 10 prints the job. However, if the controller 50 determines that the resources are no longer available, the controller 50 by way of the user interface 58 notifies the operator that there is a job fault and that additional support material is needed to complete the print job. Once the additional support material is provided, then the digital printing system 10 continues to print the job. However, the need for additional support material is just one example of the types of resources being detected. The controller 50 is also determining whether all of the other resources required to finish a print job, such as toner, are available. If any one of the resources is unavailable, the controller 50 notifies the operator by way of user interface 58.

In large printing systems where there are many feeders 20 and finishing units 40 to complete many large print jobs, the auto-management is enabled. The controller 50 examines each job ticket in the print queue to determine the resources required to complete each job. The controller 50 prompts all modules (feeders 20, print engine 30 and finishers 40) for status information, and the modules sends sensor information (sensor data) concerning the resources used in the module back to the controller 50. For each print job, the controller 50 subtracts the resources used by other print jobs having a higher priority in the print queue from the total amount of resources available. If the resources are available, then the controller 50 by way of the user interface 58 notifies the operator on the display screen 59 that the resources to print the job are available. For example, in FIG. 7, a check mark indicates that the resources are available to print the job. However, any icon may be used.

If the controller 50 determines that the resources necessary to complete a print job are unavailable, then the job is put on hold due to resource unavailability. The controller 50 by way of the user interface 58 notifies the operator on the display screen 59 that the resources to print the job are unavailable. The system would then skip to the next job. For example, in FIG. 7, an exclamation point inside a triangle indicates that the resources are available to print the job. However, any icon may be used. By highlighting and clicking on the job ticket window as shown in FIGS. 7–11, the operator can determine which resources need to be added so that the print job can be completed. If the resource needed is additional toner, then this can be seen by accessing the print engine information as shown in FIG. 6. Once the operator loads more resources so that the print job can be completed, an icon such as the check mark will then replace the insufficient resources icon (e.g., exclamation point inside a triangle) on the dipole screen 59 to show the operator that the print job can now be completed. Then, the print job waits for its turn in the queue to print and thereafter completed.

FIGS. 18–21, illustrate aspects of the accelerating paper tray programming of the present invention. The present invention provides a method for copying paper stock attributes as a group from other sources and applying them to a pick point. In particular, provide a mechanism for copying paper stock attributes embedded in a job to be copied to specific paper trays or pick points. Also, controller 50 provides a mechanism for copying paper stock attributes from one pick point to other pick points. A user has selected a job and displayed the paper stocks required by the job, permit the user to:

1. Select a paper stock.
2. Indicate that they wish to copy its attributes to a pick point.
3. Select a pick point—or multiple pick points—as the recipient of those attributes.

This could be accomplished via a Cut and Paste model, a drag and drop model, or any similar mechanism provided by the native operating system underlying the printer's User Interface.

Pre RIP, paper stock infomation is often limited to information available in job tickets and similar job processing instruction mechanisms. However, post RIP complete paper stock information—all stocks, all specified attributes—is available. This information is already extracted from the job to determine if the job can print and which pick points should be used.

Programming conflict checking for paper tray programming will continue to apply with this method since there is no assurance that paper stock is supported by a particular printer product or a specific pick point in the product. A policy for handling unspecified attributes—perhaps using the default value—would be required; this is consistent with current manual and explicit methods of paper tray programming.

Although the present invention has the greatest benefits for products with multiple pick points, it is applicable to any digital press—color or B&W—that requires that the paper stock be described via attributes.

Figure 22:
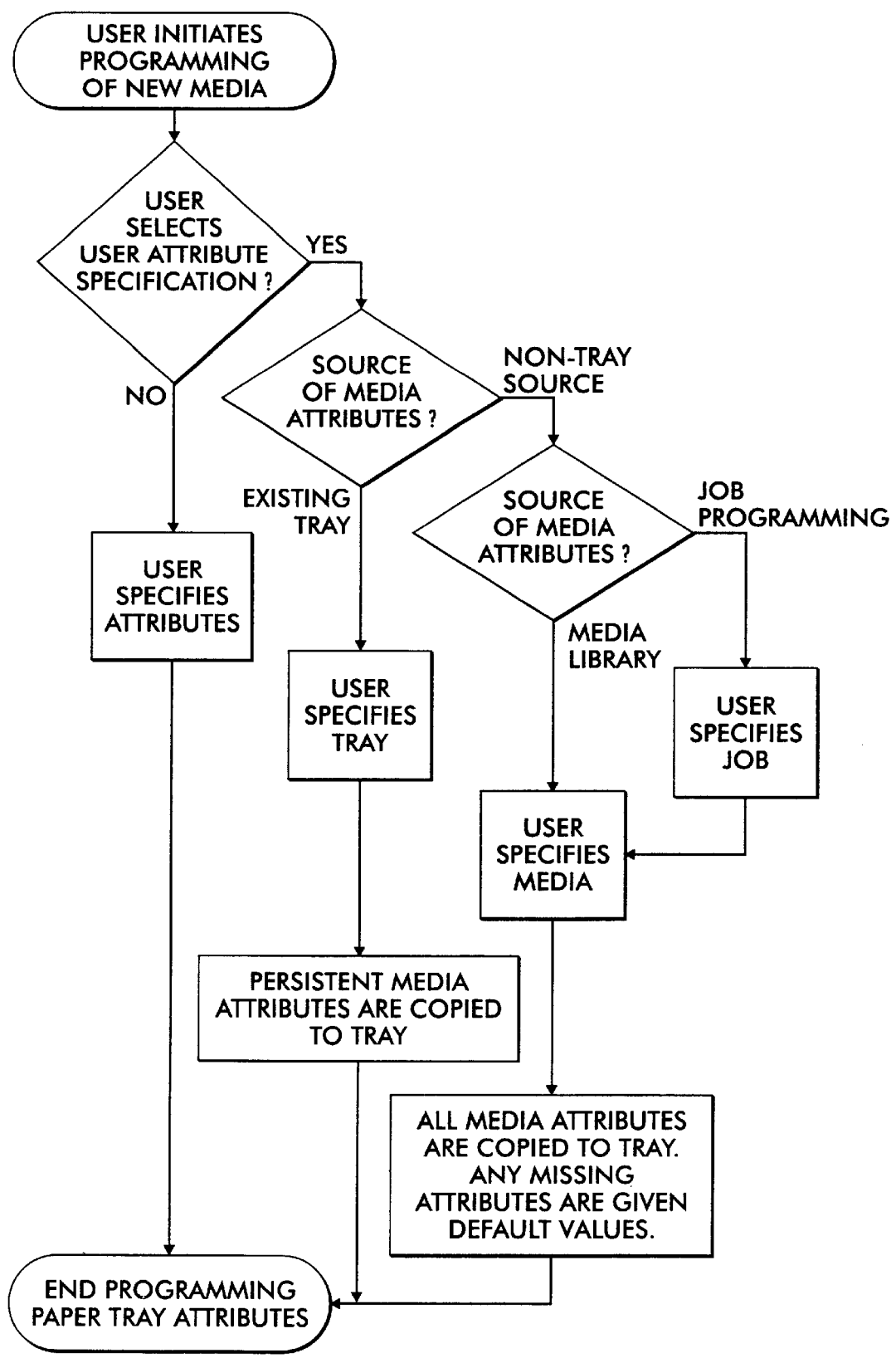
FIG. 22 is a flow chart showing the method for accelerating paper tray programming of the present invention.

Referring to FIG. 22, a user initiates programming of new media with controller 50 by way of the user interface 58 via operational tool 200. Operational tool 200 identifies stocks associated with the print media source when the print media source icon is highlighted. The stock profile lists stock attributes, which preferably include color, paper weight, size, coating and preprinting. It is understood that this list of attributes is not exhaustive. Moreover, it is understood that highlighting and clicking on an icon is only an example of one way of displaying menus. Double clicking, highlighting, single clicking, etc. can be used alone or in combination to display menus. The user selects user attribute specification in the user can input user specfies attributes thereby ending programming paper tray attributes. Or the users can look for sources for media attributes such as an existing paper tray in which "persistent" media attributes are copied to the paper tray. "Persistent" refers to intrinsic media properties such as size, type, color, caliper, etc. Non persistent or transient properties such as number of sheets, stack height, or current index position within an ordered stock; those properties are not copied. The user can further use non tray sources such as a media library or exact attributes from a Print Job.

Figure 18:
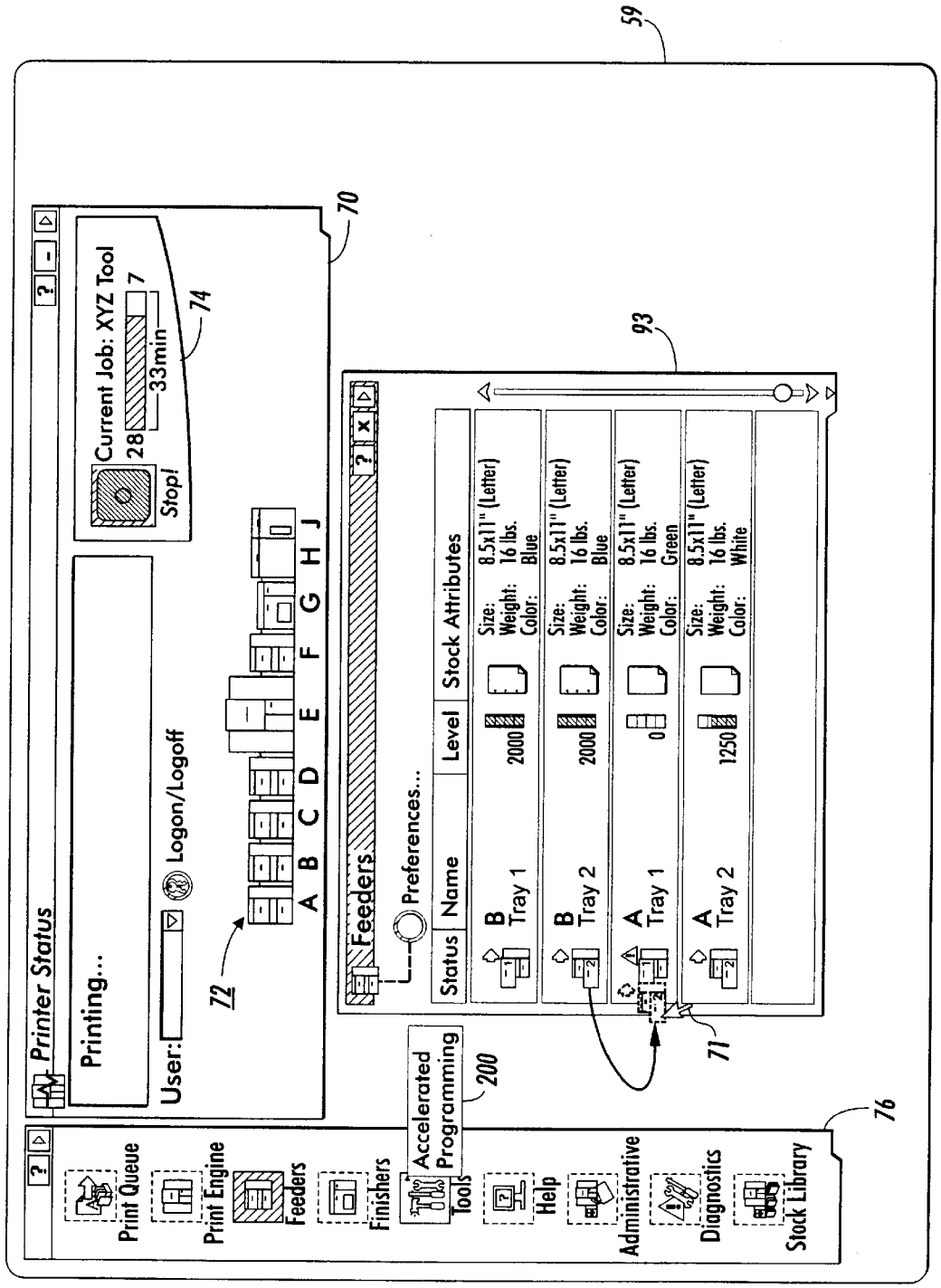
FIG. 18 is a view depicting an exemplary graphical representation of accelerating paper tray programming displayed on a user interface screen of the printing system shown in FIGS. 1 and 2.
Figure 19:
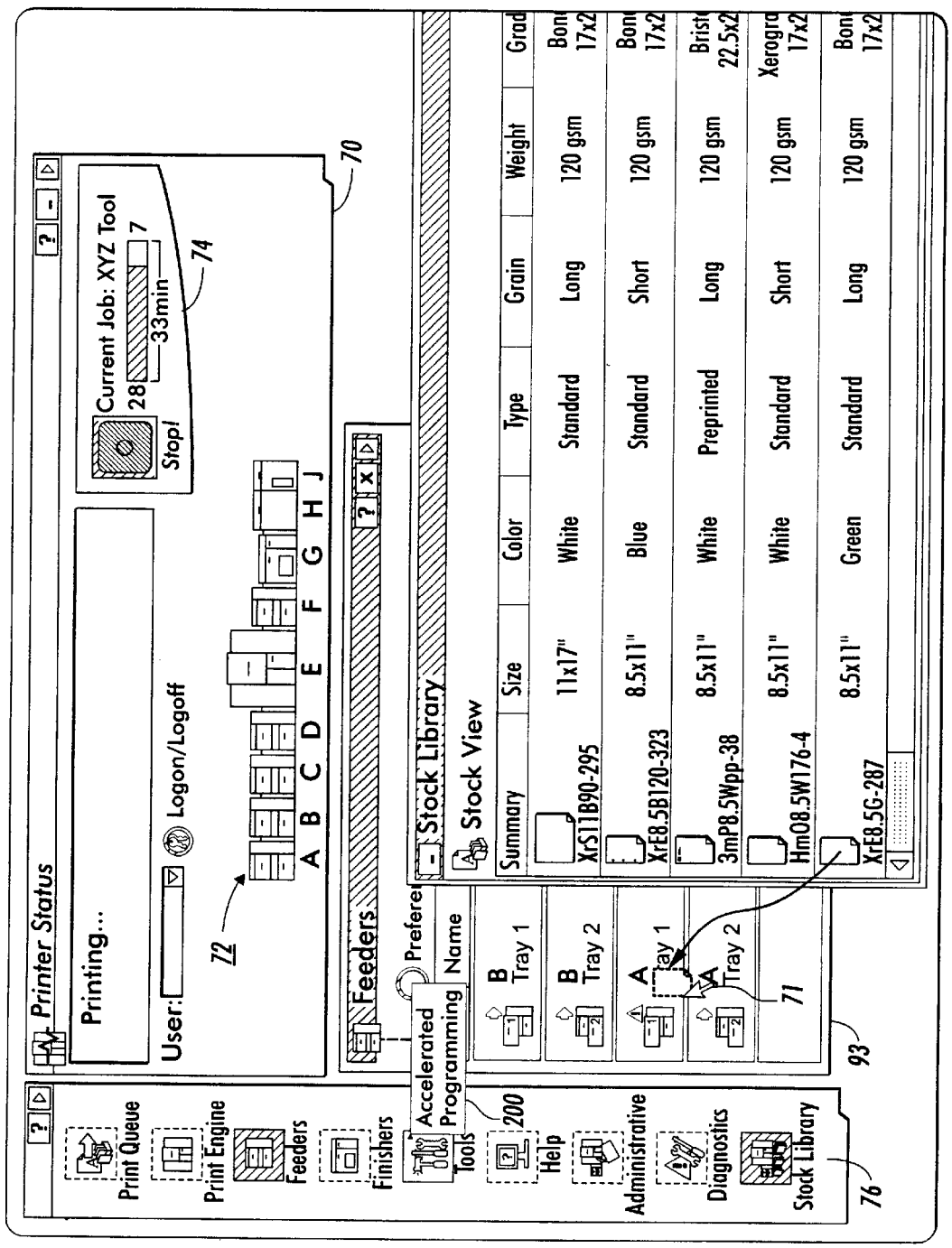
FIG. 19 is a view depicting an exemplary graphical representation of accelerating paper tray programming displayed on a user interface screen of the printing system shown in FIGS. 1 and 2.
Figure 20:
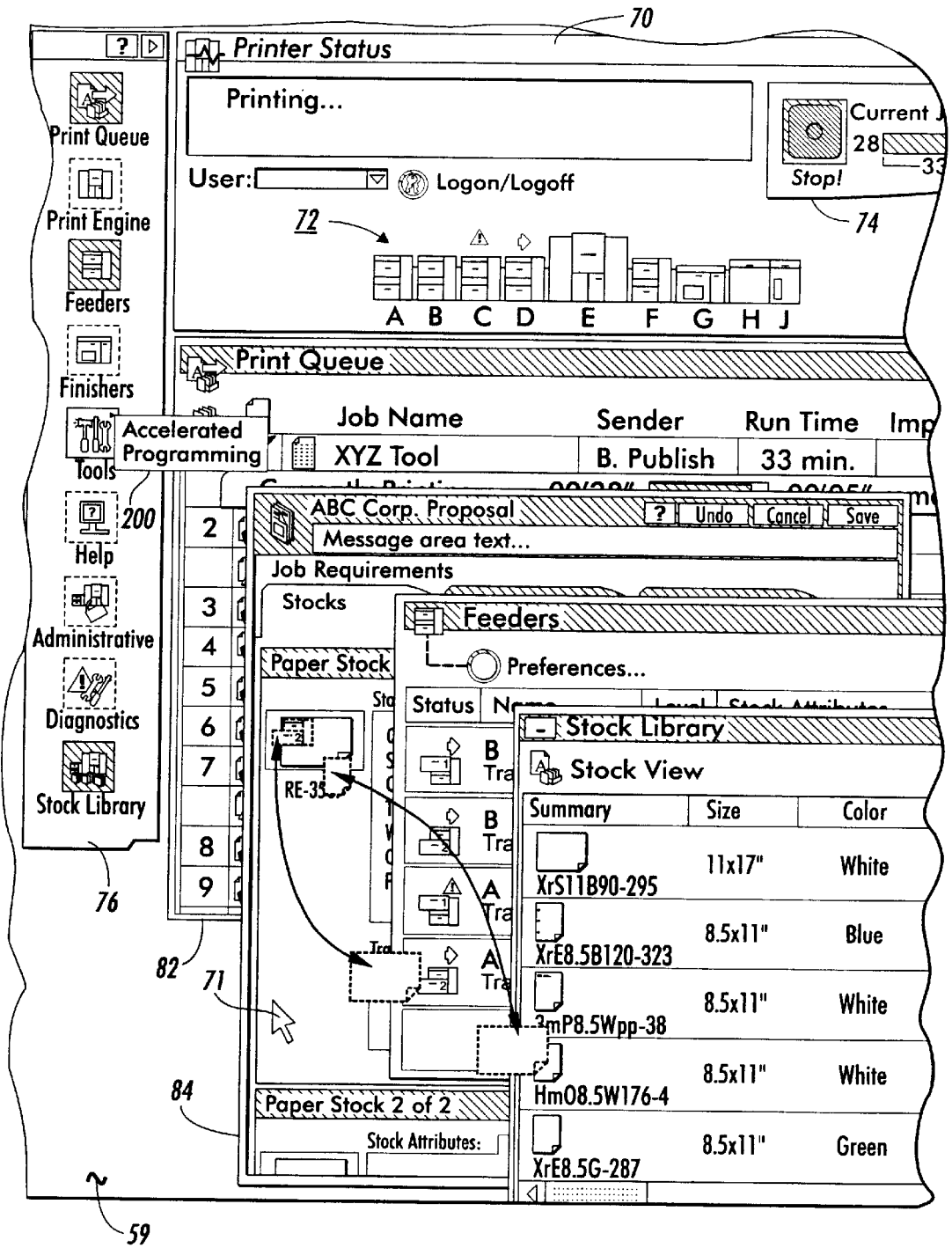
FIG. 20 is a view depicting an exemplary graphical representation of accelerating paper tray programming displayed on a user interface screen of the printing system shown in FIGS. 1 and 2.
Figure 21:
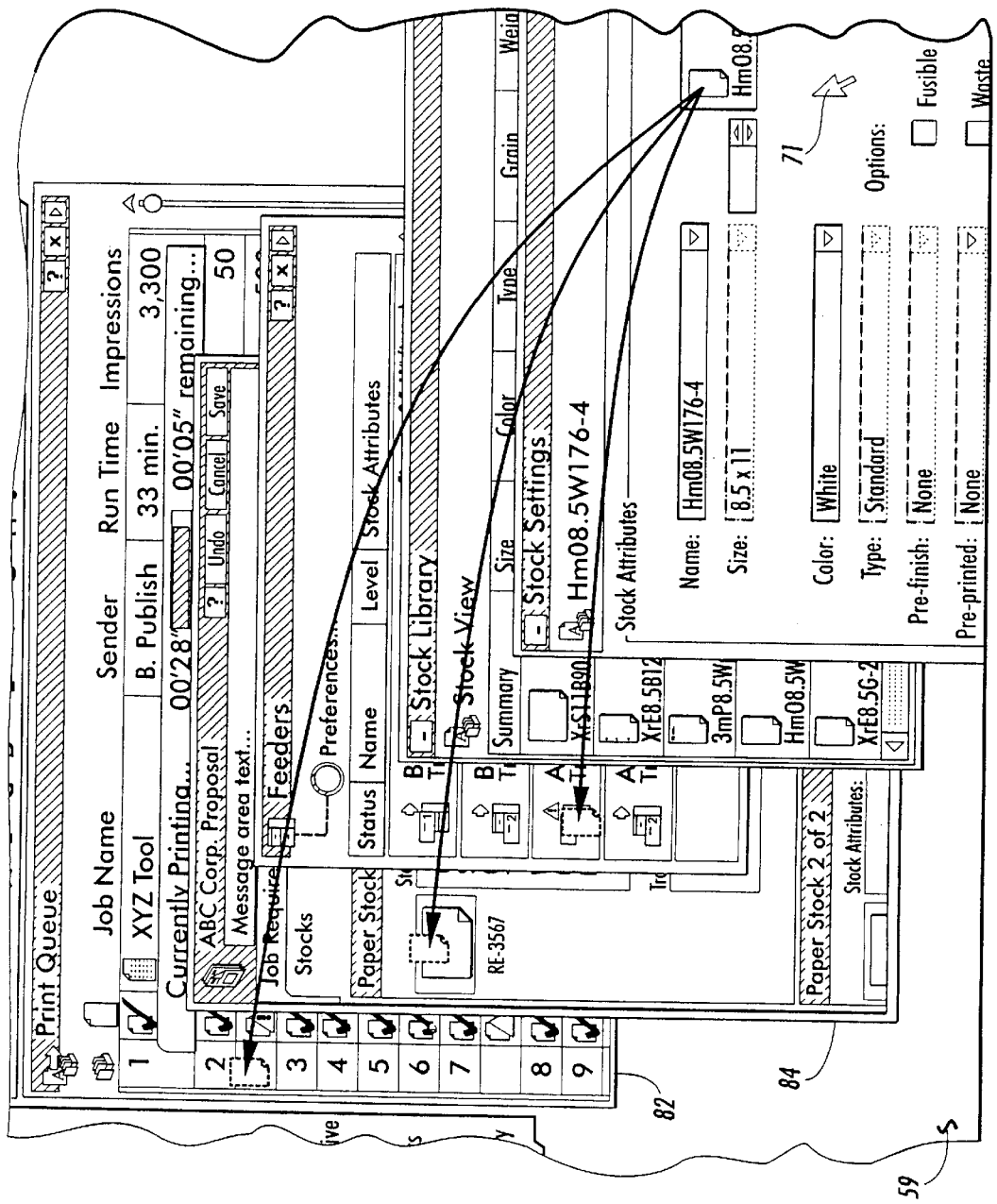
FIG. 21 is a view depicting an exemplary graphical representation of accelerating paper tray programming displayed on a user interface screen of the printing system shown in FIGS. 1 and 2.

For example FIG. 18 shows a user selecting B tray 2 and copying the attributes of selecting B tray 2 to A tray 1. FIG. 19 shows a user selecting a stock from stock library and copying the attributes to A Tray 1. FIG. 20 shows a user selecting a preprogrammed job. The user has a choice of adding that paper stock(re 3512) to the stock library or changing the stock attributes of A tray 2 to attributes of paper stock(re 3512). FIG. 21 shows an alternative programming mode, a user can replace the programmed stock to a new stock from the stock library or to a paper tray.

Figure 23:
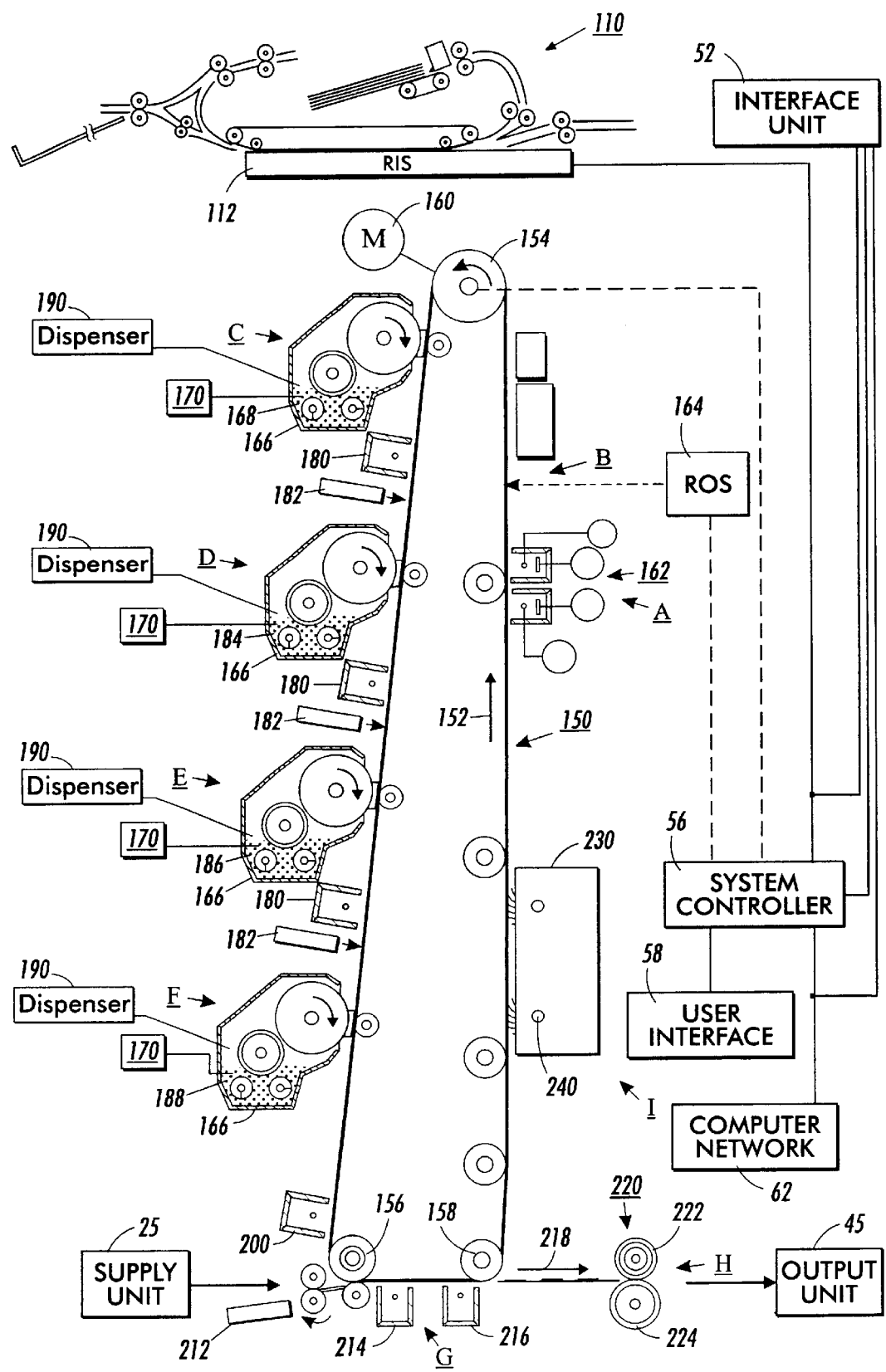
FIG. 23 is a partial schematic elevational view of an example of a printing system employing the user interface of the present invention.

FIG. 23 is a partial schematic view of a digital printing system, such as the digital imaging system of U.S. application Ser. No. 09/318,953, utilizing the navigation and control user interface of the present invention. The imaging system is used to produce color output in a single pass of a photoreceptor belt. It will be understood, however, that it is not intended to limit the invention to the embodiment disclosed. On the contrary, it is intended to cover all alternatives, modifications and equivalents as may be included within the spirit and scope of the invention as defined by the appended claims, including a multiple pass color process system, a single or multiple pass highlight color system and a black and white printing system. The present invention is applicable to a printing system having a print engine with any number of developer housings.

In one embodiment, an original document can be positioned in a document handler 110 on a raster-input scanner (RIS) indicated generally by reference numeral 112. However, as shown in FIG. 2, any scanner 64 can be utilized. The RIS 112 capture the entire original document and converts it to a series of raster scan lines or image signals. This information is transmitted to an electronic subsystem (ESS) or system controller 54 by way of interface unit 52. System controller 54 includes a pixel counter, and is connected to a user interface 58. Alternatively, image signals may be supplied by a computer network 62 by way of interface unit 52.

The print engine preferably uses a charge retentive surface in the form of an Active Matrix (AMAT) photoreceptor belt 150 supported for movement in the direction indicated by arrow 152, for advancing sequentially through the various xerographic process stations. The photoreceptor belt 150 is entrained about a drive roller 154, tension rollers 156 and fixed roller 158 and the drive roller 154 is operatively connected to a drive motor 160 for effecting movement of the photoreceptor belt 150 through the xerographic stations. A portion of photoreceptor belt 150 passes through charging station A where a corona generating device, indicated generally by the reference numeral 162, charges the photoconductive surface of photoreceptor belt 150 to a relatively high, substantially uniform, preferably negative potential.

Next, the charged portion of photoconductive surface is advanced through an imaging/exposure station B. At imaging/exposure station B, the system controller 54 receives the image signals from raster input scanner 66 by way of the interface unit 52. The image signals represent the desired output image. The system controller 54 processes these signals to convert them to the various color separations of the image which is transmitted to a laser based output scanning device, which causes the charge retentive surface to be discharged in accordance with the output from the scanning device. Preferably the laser based scanning device is a laser Raster Output Scanner (ROS) 164. Alternatively, the ROS 164 could be replaced by other xerographic exposure devices such as LED arrays. A computer network 62 may also transmit image signals to the system controller 54 by way of the interface unit 52.

The photoreceptor belt 150, which is initially charged to a voltage $V_0$, undergoes dark decay to a level equal to about −500 volts. When exposed at the exposure station B, it is discharged to a level equal to about—50 volts. Thus after exposure, the photoreceptor belt 150 contains a monopolar voltage profile of high and low voltages, the former corresponding to charged areas and the latter corresponding to discharged or background areas.

At a first development station C, developer structure, indicated generally by the reference numeral 166 utilizing a hybrid development system, the development roll, better known as the donor roll, is powered by two development fields (potentials across an air gap). The first field is the ac field which is used for toner cloud generation. The second field is the dc development field which is used to control the amount of developed toner mass on the photoreceptor belt 150. Preferably, the developer structure 166 contains magenta toner particles 168. The toner cloud causes charged magenta toner particles 168 to be attracted to the electrostatic latent image. Appropriate developer biasing is accomplished via a power supply. This type of system is a noncontact type in which only toner particles (magenta, for example) are attracted to the latent image and there is no mechanical contact between the photoreceptor belt 150 and a toner delivery device to disturb a previously developed, but unfixed, image. A toner concentration sensor 170 senses the toner concentration in the developer structure 166. A toner dispenser 190 adds new toner particles 168 to increase the toner concentration in the developer structure 166 at developer station C. The developed but unfixed image is then transported past a second charging device 180 where the photoreceptor belt 150 and previously developed toner image areas are recharged to a predetermined level.

A second exposure/imaging is performed by device 182. Device 182 preferably comprises a laser based output structure and is preferably utilized for selectively discharging the photoreceptor belt 150 on toned areas and/or bare areas, pursuant to the image to be developed with the second color toner. Device 182 may be a raster output scanner or LED window. At this point, the photoreceptor belt 150 contains toned and untoned areas at relatively high voltage levels and toned and untoned areas at relatively low voltage levels. These low voltage areas represent image areas which are developed using discharged area development (DAD). To this end, a negatively charged, developer material 184 comprising color toner, preferably yellow, is employed. The toner, which by way of example may be yellow, is contained in a developer structure 166 disposed at a second developer station D and is presented to the latent images on the photoreceptor belt 150 by way of a second developer system. A power supply (not shown) serves to electrically bias the developer structure 166 to a level effective to develop the discharged image areas with negatively charged yellow toner particles 184. Further, a toner concentration sensor 170 senses the toner concentration in the developer structure 166. A toner dispenser 190 adds new toner particles 184 to increase the concentration in the developer structure 166 at developer station D.

The above procedure is repeated for a third image for a third suitable color toner such as cyan 186 (station E) and for a fourth image and suitable color toner such as black 188 (station F). The exposure control scheme described below may be utilized for these subsequent imaging steps. In this manner a full color composite toner image is developed on the photoreceptor belt 150. In addition, a permeability sensor 200 measures developed mass per unit area. Although only one mass sensor 200 is shown in FIG. 1, there may be more than one mass sensor 200.

To the extent to which some toner charge is totally neutralized, or the polarity reversed, thereby causing the composite image developed on the photoreceptor belt 150 to consist of both positive and negative toner, a negative pre-transfer dicorotron member 214 is provided to condition all of the toner for effective transfer to a substrate using positive corona discharge.

Subsequent to image development a sheet of support material 212 from supply unit 25 is moved into contact with the toner images at transfer station G. The sheet of support material 212 is advanced to transfer station G by the supply unit 25. The sheet of support material 212 is then brought into contact with photoconductive surface of photoreceptor belt 150 in a timed sequence so that the toner powder image developed thereon contacts the advancing sheet of support material 212 at transfer station G.

Transfer station G includes a transfer dicorotron 214 which sprays positive ions onto the backside of support material 212. This attracts the negatively charged toner powder images from the photoreceptor belt 150 to support material 212. A detack dicorotron 216 is provided for facilitating stripping of the sheets from the photoreceptor belt 150.

After transfer, the sheet of support material 212 continues to move, in the direction of arrow 218, onto a conveyor (not shown) which advances the sheet to fusing station H. Fusing station H includes a fuser assembly, indicated generally by the reference numeral 220, which permanently affixes the transferred powder image to support material 212. Preferably, fuser assembly 220 comprises a heated fuser roller 222 and a backup or pressure roller 224. Support material 212 passes between fuser roller 222 and backup roller 224 with the toner powder image contacting fuser roller 222. In this manner, the toner powder images are permanently affixed to support material 212. After fusing, a chute, not shown, guides the advancing support material 212 to the output unit 45, which includes one or more finishers 40 such as a catch tray, stacker, binder, stapler or other output device, for subsequent removal from the printing system by the operator.

After the sheet of support material 212 is separated from photoconductive surface of photoreceptor belt 150, the residual toner particles carried by the non-image areas on the photoconductive surface are removed therefrom. These particles are removed at cleaning station I, preferably using a cleaning brush or plural brush structure contained in a housing 230. The cleaning brush 240 or brushes 240 are engaged after the composite toner image is transferred to a sheet. Once the photoreceptor belt 150 is cleaned the brushes 240 are retracted utilizing a device incorporating a clutch (not shown) so that the next imaging and development cycle can begin.

System controller 54 regulates the various printer functions. The system controller 54 is preferably a programmable controller, which controls printer functions hereinbefore described. The system controller 54 may provide a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by an operator. Conventional sheet path sensors or switches may be utilized to keep track of the position of the document and the copy sheets.

While the figures show one example of a printing system incorporating the user interface navigation and control system of the present invention, it is understood that this process could be used in any printing system.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

What is claimed:

1. In a printing system with one or more discrete print media trays, a marking engine and a controller in which prints are produced from a plurality of print jobs by using the controller to control delivery of print media sheets from the one or more discrete print media trays to the marking engine, each of said plurality of print lobs including a plurality of said predefined print media attributes; the one or more discrete print media trays respectively including the print media sheets haying a plurality of print media attributes, a method for programming the one or more discrete print media trays, comprising:

selecting one of said plurality of print jobs; said selecting step comprises:
displaying sets of said print media attributes on an user interface wherein each set consist of at least two of said plurality of print media attributes;
selecting one or more of said sets of said plurality of said predefined print attributes on said user interface which corresponds to the predefined print media attributes of said print job to be printed;
correlating said plurality of said predefined print attributes of the selected one of said plurality of print lobs to said plurality of pint media attributes of the print media sheets stored in said one or more discrete print media trays; and
if said plurality of said predefined print attributes do not correlate with said plurality of print media attributes of the print media stored in one of said one or more discrete print media trays, assigning one or more of said plurality of said predefined print attributes to one of said one or more discrete print media trays, comprises:
sending a feedback signal to said user interface indicating one of said one or more discrete print media trays to be loaded with print media having said plurality of said predefined print attributes.

2. The method of claim 1, further comprising repeating the steps of selecting, correlating and assigning for a second print job.

* * * * *